United States Patent
Samid

(10) Patent No.: US 11,394,530 B2
(45) Date of Patent: Jul. 19, 2022

(54) RANDOSOL: RANDOMNESS SOLUTIONS

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 72 days.

(21) Appl. No.: 17/063,523

(22) Filed: Oct. 5, 2020

(65) Prior Publication Data

US 2021/0075593 A1    Mar. 11, 2021

Related U.S. Application Data

(63) Continuation-in-part of application No. 15/997,662, filed on Jun. 4, 2018, now Pat. No. 10,798,065.

(60) Provisional application No. 62/580,111, filed on Nov. 1, 2017, provisional application No. 63/034,401, filed on Jun. 4, 2020, provisional application No. 63/051,652, filed on Jul. 14, 2020, provisional application No. 63/005,062, filed on Apr. 3, 2020, provisional application No. 62/963,855, filed on Jan. 21, 2020, provisional application No. 62/931,807, filed on Nov. 7, 2019, provisional application No. 62/926,560, filed on Oct. 27, 2019.

(51) Int. Cl.
*H04L 9/06* (2006.01)

(52) U.S. Cl.
CPC ........ *H04L 9/0662* (2013.01); *H04L 2209/08* (2013.01)

(58) Field of Classification Search
CPC .......................... H04L 9/0662; H04L 2209/08
See application file for complete search history.

(56) References Cited

U.S. PATENT DOCUMENTS

| | | | | |
|---|---|---|---|---|
| 6,014,445 A | * | 1/2000 | Kohda | H04L 9/001 380/28 |
| 6,643,374 B1 | * | 11/2003 | Wells | H04L 9/0662 380/47 |
| 6,697,829 B1 | * | 2/2004 | Shilton | H03K 3/84 708/255 |
| 10,333,708 B1 | * | 6/2019 | Diamant | G06F 7/588 |
| 2005/0005156 A1 | * | 1/2005 | Harper | H04L 9/3247 726/26 |
| 2005/0213760 A1 | * | 9/2005 | LeComte | H04N 7/1675 380/217 |
| 2009/0172056 A1 | * | 7/2009 | Pradhan | H04L 9/0662 708/255 |
| 2010/0177898 A1 | * | 7/2010 | Tuyls | H04L 9/3278 380/270 |
| 2010/0195829 A1 | * | 8/2010 | Blom | H04L 9/0872 380/255 |
| 2012/0045053 A1 | * | 2/2012 | Qi | G06F 7/588 380/252 |
| 2016/0028544 A1 | * | 1/2016 | Hyde | G06F 3/0637 380/44 |
| 2018/0034629 A1 | * | 2/2018 | Cheng | G06F 21/72 |
| 2019/0384894 A1 | * | 12/2019 | Stecklina | H04L 9/0662 |

* cited by examiner

*Primary Examiner* — Yonas A Bayou

(57) ABSTRACT

A random flux of rising bubbles generates a fluctuating electrical current that is processed into a high-quality bit stream. Any stream of fully or mildly randomized bits is measured for its degree of randomness, and that randomness is amplified or attenuated as the case may be. Impact on ciphers and cyber security tools that rely on randomness.

5 Claims, 5 Drawing Sheets

Fig.-3
Randomness Separation
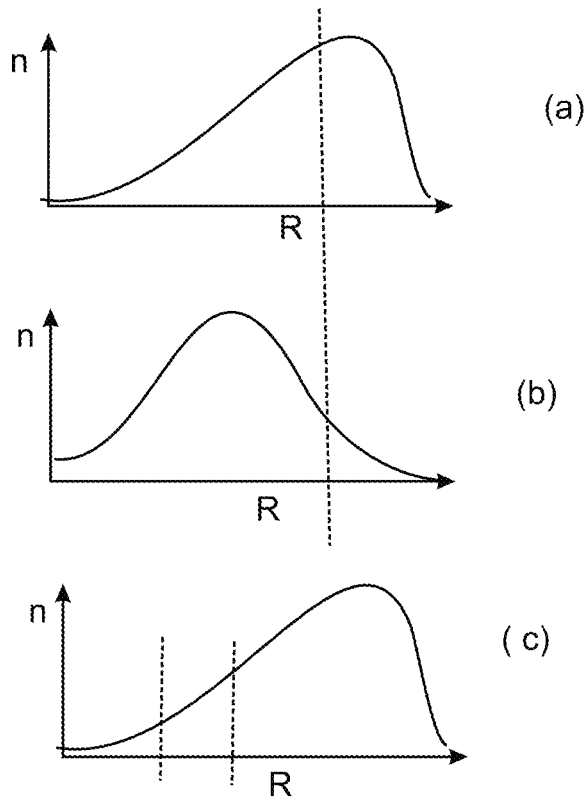
Fig.-4 Symmetry Randomness Frequency Curve
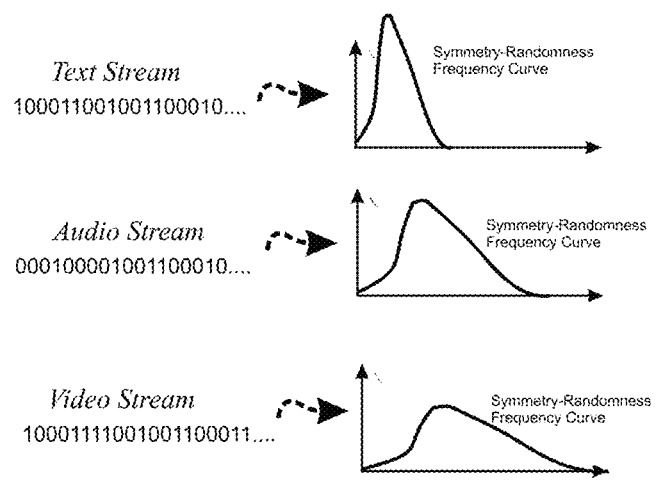

Randomized Bubbles Apparatus

Bubble Pump Feedback

Decorative RBA

RANDOSOL: RANDOMNESS SOLUTIONS

BRIEF OVERVIEW

Proposing to satisfy the growing need for target quality high-integrity randomness with new technology to generate, amplify, share, examine and gauge randomness. Proposing a physical source for randomness, enhanced with randomness amplification system, and an operation and a methodology to examine randomness for integrity and efficacy, as well as to handle mild randomness. The physical source is the "RandoBubbler" wherein rising bubbles between two electrodes result in fluctuating current, which may be fed back to impact the regimen of the rising bubbles, resulting in a randomized current over time. The randomized bits generated by the RandoBubbler or by any other source are fed into a randomness assessment (RandoGauger), and randomness amplification system (RandoBoost) which divides the incoming bit flow to successive bit strings, then evaluates each string for its randomness credentials, marking and separating as desired between strings according to their randomness attributes. This leads to randomness amplification, and to division of the incoming bit stream according to randomness attributes of the constituting strings. The randomness credentials are evaluated two ways. One, on the basis of the premise that randomness is the lack of symmetry, hence every bit string that shows high degree of symmetry is not bona fide random. Several symmetry tests are applied. Two: on the basis of a framework of smaller substrings, the more of them that are needed to construct an examined string the higher the randomness of the examined string. These systems and methodologies amount to a tool box used combined, or separately, to satisfy a universal need for target-quality randomness on demand. Effective detection of randomness variance is a sensitive detector of hard to detect malware. Two parties sharing a secret physical RandoBubbler will enjoy mathematical secrecy communication.

The figure shows the operation of the the RandoBubble. Part (a) shows the container where the two fluids mix and where the electrodes are positioned in order to measure the current between them (the randomness measuring capsule). Letter (b) indicates the heavier fluid, marked as white, filling the measuring capsule. Letter (c) indicates the lighter fluid, marked in black. It bubbles through the heavier fluid and is pumped back through pipes to recycle as bubbles through the heavier fluid. Letters (d) and (e) show the electrodes position in a geometry that is designed to make the bulk of the fluid mixture in the capsule impactful on the resultant level of the current. Letter (l) indicates the Bubble Generator that is designed to randomly generates bubbles in varying flow rate and varying bubble size. Letter (g) indicates the pump that circulates the the light fluid through the system. Letter (h) represents the electronic circuitry that is (i) setting up the current in the capsule and measuring it. The electronic circuitry may or may not receive input stream to impact its operation (marked I). The circuitry, h, controlling the pump and the the Bubble Generator (f). The circuitry then processes the measured current over time and generates out of it, a stream of random bits, j.

Figure 1:
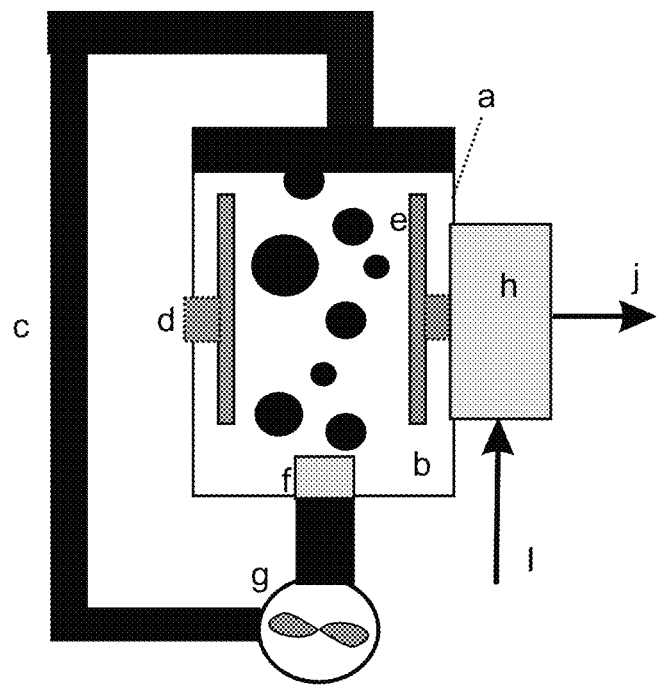
FIG. 1 RandoBubble—Closed System
Figure 2:
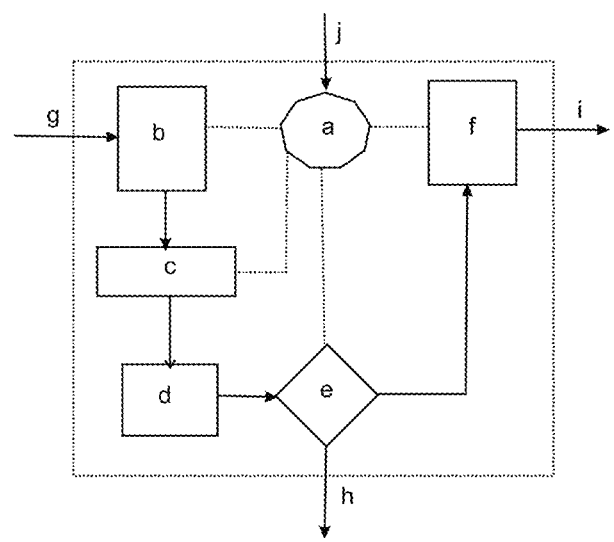

FIG. 2: RandoBoost Flowchart

This figure shows the RandoBoost unit with two input streams: (g, and j). Input stream g is the randomness candidate stream. Bits that are purportedly randomized to some threshold degree or above. Input stream j is optional. It may be regarded as guidance information for the RandoBoost to guide it in its operation. Such guidance may be built in, so stream j will not be necessary. The RandoBoost unit has two output streams. Output i is the boosted bit stream (B), the product of the RandoBoost. Output stream h is the discarded bit flow. It may be simply erased and not an output, or it may be sent out for further analysis. Stream j is fed into the control unit of the RandoBoost marked as polygon a. The control unit oversees the operation in the RandoBoost. The candidate bit stream, g is fed into the input accumulator unit, b. In this accumulator the input stream, g, accumulates. It has enough capacity to handle a-synchronicity in the operation. But when it fills up, the controller unit will close down the RandoBoost. The string preparation unit, c, will chop the next string to be evaluated for randomness from the input accumulator. As shown by the arrow leading from b to c. The string prepared in c is then passed to unit d which is the randomization evaluator. It assigns a randomization level $\rho$ between 0 and 1: $0 \leq \rho \leq 1$. The string and its evaluated randomness are passed to unit e. Unit e received from controller unit a the threshold level T for accepted randomness. Unit e then performs a logical check. If the randomness of the passed along string, $\rho$, is higher than the assigned threshold T, then the string is considered of sufficient randomness, and is passed to unit f which is the output accumulator. The output accumulator accumulates the incoming cleared strings, ready for them to be sent out to their consumer. If the inspected string has a randomness value below the threshold then it is either discarded or sent out as indicated by arrow h, leading to an external unit for further analysis.

FIG. 3 Randomness Separation

This figure shows three cases of randomness separation. In the three cases the input stream is shown per distribution of strings according to their calculated randomness value, $\rho = R$. The vertical axis shows how many strings there are in some large section of input stream per a given value of randomness, R. Case a shows a high quality source, most of the strings are of high quality. The vertical dotted line shows the borderline between strings that were accepted, to the right of the dotted line, and strings that were rejected, left to the dotted line. About a third of the incoming strings are accepted. It means that the output string from the RandoBoost is about ⅓ the bit flow rate of the incoming candidate bits. The dotted line is placed on the assigned threshold value for the RandoBoost. Case b shows a lower quality randomness source where the majority of the incoming strings is below the threshold level. The accepted strings (right to the dotted line) are about ⅑ of the incoming strings. So in this case the output stream will have ⅑ the bit flow rate of the incoming bits. However the quality of the output stream will be the same in both cases a and b. So one say that the RandoBoost equalizes randomness sources, and generates a uniform output from high quality to low quality input randomness streams alike. Case (c) shows a randomness suppressor at work. Two vertical dotted lines indicates the interval of randomness values to be accepted for the output. The output then will have mild randomness as desired.

FIG. 4: Symmetry Randomness Frequency Curve

Exhibiting how text, audio, and video streams may be characterized via a signature curve that depicts the distribution of randomness measures for each type of content.

Figure 5:
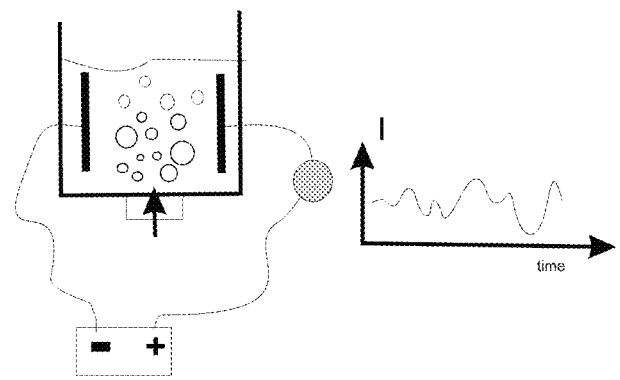

FIG. 5: Randomized Babbles Apparatus (RBA)—The RandoBubbler

The figure shows a container filled with an electrolyte solution. Two opposite polarity electrodes are fitted inside, connected to a power source that generates an electrical current. The current is measured (see grey circle marks the meter), and its value over time is recorded, as shown in the graph on the right. At the bottom of the container there is a source for an injected fluid that does not mix with the electrolyte solution in the container (e.g. air, or oil), and that does possess a conductivity value quite different from that of the electrolyte. That source (marked as a bottom rectangular) is generating bubbles of the second fluid in the electrolyte fluid. As the bubbles rise up, they change the effective conductivity of the liquid, and as a result change the electrical current in the circuit. These changes qualify as random for a vast majority of consumers of randomness. The recorded changes of the current over time are translated to a randomized sequence of bits.

Figure 6:
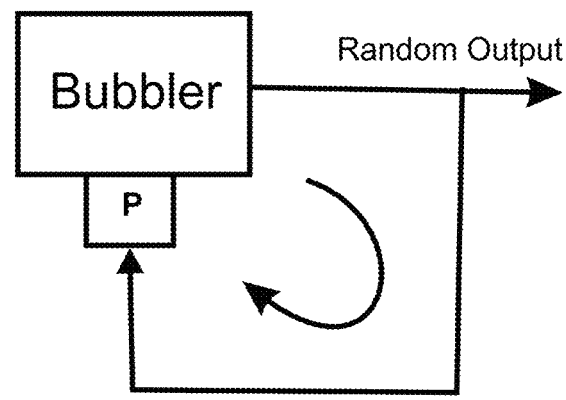

FIG. 6 Bubble Pump Feedback

This figure shows how the random output of the bubbler (the RBA) is fed back to change the operating parameters of the bubble pumps, and hence change the random output. This auto feedback further insures the randomness of the output.

Figure 7:
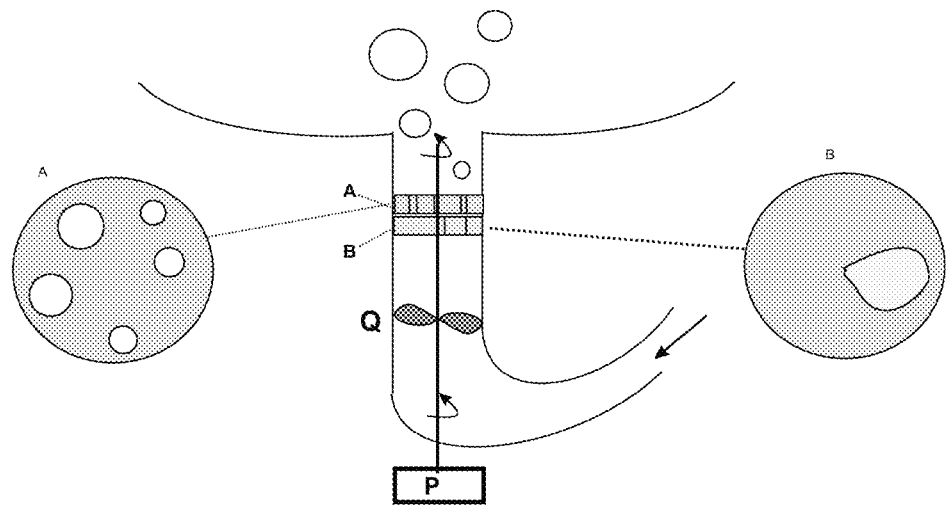

FIG. 7: Rotating Disk Bubbler

This figure shows a particular mechanism for bubbles generation. Fitted at the bottom of the container of the electrolyte, the mechanism is comprised of two disks, one (B) at rest, and one (A) a rotating disk. The two disks have specially designed openings. An example is shown in the drawing. Below the disks there is a power source that pushes the second fluid to the container (e.g. air). This second fluid can only pass through area where the openings of the two disks A and B overlap. Because of the rotation of disk A such overlap is short lived and generates a bubble according to the properties of the two involved networks, the geometry of the two disks, the speed of rotation of the rotating disk, and the momentum given to the injected fluid through the pump (P).

Figure 8:
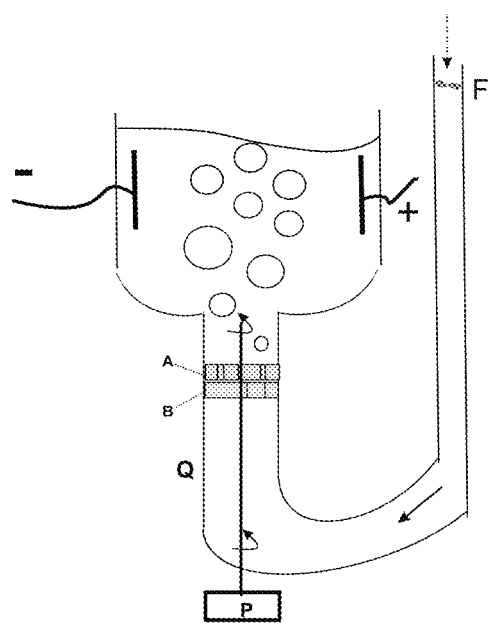

FIG. 8: Open Air Bubbler

This figure shows a set up to blow air bubbles into a RBA via a fan F. A motor P is rotating the rotating disk.

Figure 9:
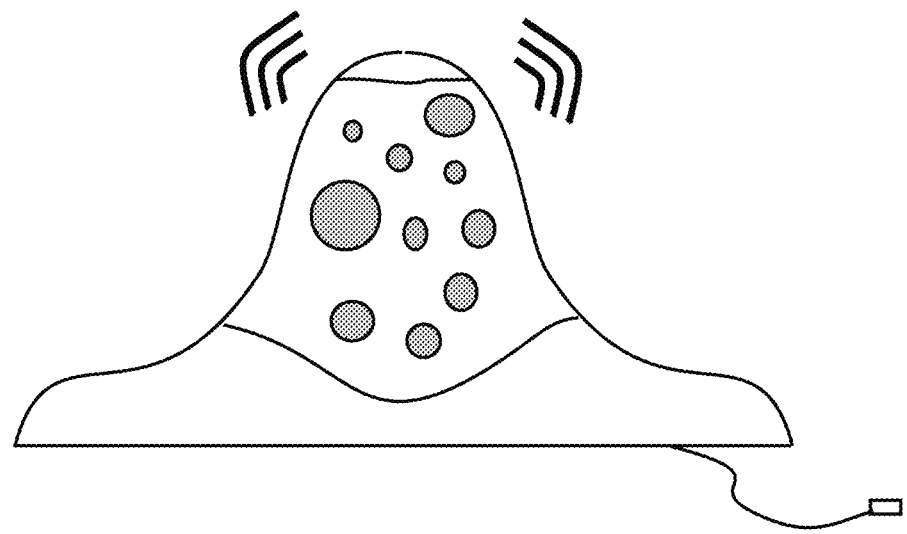

FIG. 9: Decorative RBA

The figure shows a decorative RBA where the rising bubbles are visible through a see through wall of the fluid container. The apparatus is shown to be equipped with a cord connected bit transfer option or, alternatively with a WiFi.

INTRODUCTION

Randomness is an essential ingredient in almost every cyber security protocol. Sometimes it is shared, some time it is unilaterally used. Attackers aim to gain advantage by compromising the randomness flow to these protocols. They can do so by hacking algorithmic randomness—the most common source, by compromising pre-generated randomness, and by replacing a bona fide source of randomness with a planted feed.

Algorithmic randomness is hackable. Von Neumann said that anyone using algorithmic randomness does not understand algorithms and does not understand randomness. Pre-packed digital randomness is stealable. And randomness communication lines may be intercepted. In light of the above we propose:
1. A convenient source of physical randomness.
2. An operation for assessing randomness and enhancing it.

Together these innovations will head off the risks outlined above.

This invention also addressed the issue of mild-randomness: digital streams which show better predictability than a perfect random strings, but retain a predictability nonetheless. A host of applications arises for bit strings with such varying degrees of entropy. A typical plain body of text, exhibits a lower entropy than an AES encrypted text. An effective measurement of such mild-randomness bit strings opens the door to subtle intrusion detection.

This invention also offers means to see hidden pattern in a random looking string, giving rise to various applications based on such pattern detection.

A Convenient Source of Physical Randomness

Proposing a randomization source based on changes in an electrical current passed through a mixture of two mutually non-dissolving fluids of different electrical conductivity. Where the lighter fluid rises as a stream of bubbles inside a bulk of the other fluid such that when two electrodes are situated inside the bulk fluid the effective current depends at any moment on the sizes and the positions of all the bubbles that rise between the electrodes. To the extent that this bubble configuration is random over time, so is the current. The bubbles are introduced into the between the electrodes space through a "bubble feed mechanism".

A key aspect of this contraption is the fact that it is infeasible to predict the randomized output current of the contraption from knowledge of the pattern used for the bubble feed mechanism. One needs to actually use the contraption in order to measure the resulting randomized current.

Yet, fluid mechanics operates on classic physics, not quantum physics, so given two identical contraptions, with identical settings, the measured randomness on both devices will be the same. For this aspect this random bubbles contraption (RandoBubbler) has an advantage over quantum sources of randomness, which cannot be shared at generation time, except through entanglement which is hard, limited, and not widely available, prospectively for a long time.

Naturally the RandomBubbler can be used for unilateral applications where no sharing is required.

Randomness Assessment and Amplifications Systems

Randomness is a fuzzy notion. No specific binary string, however random in appearance, can be proven to have been generated by a randomized source. And no specific binary string, however non-random in appearance, can be proven not to have been generated by a randomized source.

A common way to assign randomness attributes is to check if a particular substring of size n appears in a larger string of size m, as many times as randomness will dictate. Alas, given any purported randomized stream of size m bits, it is possible to find a smaller string of size n<m bits such that its frequency in the larger string will be way off the dictates of randomness.

Given a sufficiently long string of bits, emanating from a perfect source of randomness it will issue substrings with very poor randomness. Such patternful substrings may serve as seeds for compromising secure cyber systems.

Because of all the above it is helpful to device a test for randomness which is not based on frequency of appearance of a given substring. Such test can be used to rate the quality of a source of randomness and to augment such input flow of randomness to a better quality output flow, clean from the patternful substrings.

The quality test can be conducted just prior and close by to the place and time when and where the randomness is used. Thereby any attempt to intercept even perfect (quantum grade) randomness and replace it with contrived randomness will be quickly spotted.

Functional Configuration

This Randomness Solution (RandoSol) is an assembly of modular elements: (1) RandoBubbler, (2) RandoGauger, (3) RandoBoost and related modules. They can be used together, or in any modular combination of one or more elements.

The most comprehensive nominal use is in series: RandoBubbler→RandoGauger→RandoBoost In that comprehensive configuration randomness is generated from the RandoBubbler, streamed into the RandoGauger that reports quality level, and in parallel or following to the RandoBoost to boost, if necessary, the quality of the generated randomness. From there the random stream is fed to its consumer.

The RandoBubbler can generate a random bit stream directly to a consumer. The RandoBoost and RandoGauger can operate individually on a bit stream of any source.

The RandoBubbler can be operated unilaterally and bilaterally. In the former case the randomness is not shared, while shared in the latter case.

In the bilateral case two parties will need to operate duplicates of the physical contraption.

Additional applications relate to mild-randomness situations. The RandoGauger will filter out an arbitrary stream of bits to a stream with designated range and pattern of randomness, from zero randomness (total pattern total predictability) to perfect randomness (50% predictability of next bit). In general an arbitrary input stream of bits will be divided per r randomness ranges to r constituent streams.

The RandoBubbler

The RandoBubble is a device comprising:
1. Heavy Fluid, H 2. Light Fluid, L 3. Fluid Container 4. A Pump 5. A Bubble Generator 6. A Current Generator 7. A Randomness Extractor 8. Operational Appendices It operates as follows:

The Bubble Generator system generates bubbles of the lighter fluid rising through a bulk of the heavier fluid. Two opposite electrodes are placed such that the fluid mix between them carries the current between the electrode. Since the two fluids are by design of different electrical conductivity, the effective current between the electrodes depends on the configuration (size, count, position) of the bubbles in the cross path between the electrodes. As the bubbles of the lighter fluid rise inside the heavier fluid, the value of the current over time changes. The principle of the RandoBubbler is that these changes are well randomized, to the extent that the Bubble. Generator is not generating a steady uniform bubble regimen.

The relationship between the bubble generation mechanism and the reading of current fluctuations is complex. It depends on the bubble generation mechanism and on the geometry of the apparatus where the current is measured. It is considered infeasible to predict the current fluctuation from knowledge of the input data to the bubble generator, and hence the output of the RandoBubbler is safe from attack. To the extent that two duplicate devices are used, then two users will be able to share randomness based on their possession of the device. The communicating parties will be able to share in the open the input data for the bubble generation device, and expect to generate the same randomness as output from the RandoBubbler.

The lighter fluid, L, will be pumped to the bottom of the container where the current is measured (the measurement capsule). If the light fluid is air, the bubbles may be released, otherwise the light fluid will be circulated.

To neutralize any depositions on the electrodes, the current may be reversed as often as needed. One fluid may be a normal electrolyte, and the other may be an organic compound. Also the light fluid may be gas, like air.

The fluctuating current, generated by the current generator, will be processed to extract from it a series of random bits by the Randomness Extractor. It can be done in various ways, as commonly practiced.

The Bubbles Generator

One way to generate bubbles, is to pump the lighter fluid L through a series of disks that rotate at various speeds. The rotation is happening perpendicular to the direction of the fluid flow. The disks are abreast from each other and each is snug into the holding pipe section. Each disk rotates at a particular speed, either clockwise or counterclockwise, each disk rotates at a given speed. Each disk has holes drilled in it. As the disks rotate each at its own speed and its own direction then every so often the holes in all the disks align and through that combined hole the lighter fluid escapes upward into the bulk of the heavier fluid. As the disks keep rotating this particular opening is closed and the escaped lighter fluid forms a rising bubble that climbs up through the bulk of heavier fluid, to the surface of the heavier fluid. As such a bubble climbs up it changes the makeup of fluid mix between the electrodes, which in turn changes the current that flows between the electrodes. These changes of current are the source of the generated randomness.

At a certain time later another hole alignment is happening. Again some holes in all the disks are in an overlapping state, admitting another bubble to rise. And so on. The frequency of the rising bubbles is determined by the speeds of rotation of the various disks, and the size of each bubble depends on the size of the throughput hole, and on the time it stays open, which again depends on the speed of rotation of the various disks.

Any variance in the speeds and directions of the rotating disks will result in a different regimen of rising bubbles, which in turn will result in a different fluctuations of the measured current between the electrodes.

Fluid Container

The fluid container may be made tall, to allow for a longer duration of a rising bubble and more variance in bubble regimen inside the container. The container may be made transparent to allow a visual pleasure from observing the rising bubbles, knowing that these bubbles are useful—they generate randomness.

Randomness Extractor

There are various ways to extract a series of random bits from a random fluctuations of an electrical current. One could sample the current every given time interval $\Delta t$, and if a reading is higher than the previous reading then one writes down a bit "1", it the reading is lower, or the same as the previous reading, then one writs "0". This continues from one interval to the other, resulting in a random series of bits.

One could integrate the current over a Δt, and use the fluctuations in the integrated value to extract a random bit series as described above.

Once could how many time the current flipped from rising to declining or vice versa within a given time interval Δt. If the number of flipping is even, one writes down "0", if the number of flipping is odd, then one writes down "1". This method is more useful for shared randomness because it is tolerant to minor inconsistency in actual current readings. Flipping of direction of current from going up to going down or vice versa, are more consistent between two RandoBoost devices used for secret shared communication.

The literature offers additional ways to extract a random bit series from a fluctuating function.

Operational Appendices

The RandoBoost is run via a controller unit. It has an means to output the cleared randomness. It may be a physical electronic port, or it may be a WiFi channel, or BlueTooth, or an NFC channel, as the case may be, passing the generated randomness to its consumer or to is Rando-Boost or RandoGauger.

The controller controls the pump that circulates the lighter fluid. It controls the rotating disks that generate the bubbles. The controller may be receiving randomness parameters from an external port. Such operational input will guide the controller to run the pump and to the disks in the bubble generator. Such guidance may be provided by the randomness output from the device itself, constituting a feedback mechanism.

To start the RandoBoost one will pour the heavier fluid, if liquid, or pump the heavier fluid in, if in gaseous phase. Then the lighter fluid will be pumped (all the above relevant to a closed system RandoBoost). After the two fluids were introduced into the RandoBoost, the pump will be operated. Over time the light fluid will be bubbling through the heavier fluid and phase separation will occur, making the device ready for operation.

The RandoBoost/RandoGauger

The RandoBoost is a procedure embodied either in software or in hardware, or in firmware, designed to spot stretches of bits which are not sufficiently random, and remove them, creating thereby an output string that is of higher quality of randomness.

The RandoBoost operation may reduce the bit throughput. One could gauge how much off-randomness to accept, and thereby how much smaller the output flow will be compared to the input.

The criteria for declaring an arbitrary bit string as random, and specifically, assign it a level of randomness from 0 (zero randomness) to 1 (perfect randomness) is described in detail in the continued application. The method will assign a randomness metric between 0 and 1 to any arbitrary bit string. The user of the RandoBoost will assign at will a randomness threshold, below which a string is rejected.

The operation will proceed as follows: a string of input bit (raw randomness, or 'randomness candidates, or the 'candidate stream'), will be taken in by the RandoBoost unit. The first $|s_1|$ bits in the candidate stream will be taken by the RandoAnalyzer, regarded as string $s_1$. The RandoAnalyzer will then determine if this $s_1$ string meets the arbitrary set randomness threshold, T. If it does not meet the threshold ($\rho(s_1)<T$) then string $s_1$ is discarded. If it does meet the or exceeds the threshold ($\rho(s_1) \geq T$) then it is routed to the output port of the RandoBoost unit, and sent out to the consumer of this randomness. We use $\rho(x)$ or $R(x)$ to indicate randomness of string x, as evaluated by the RandoAnalyzer.

The same operation continues with the next $|s_2|$ bits in the candidate stream, string $s_2$ is taken up, and checked against the same randomness threshold T. Based on the results $s_2$ may be discarded or routes for consumption.

This goes on for strings $s_3$, $s_4$, . . . as long as candidate bits flow in to the RandoBoost unit.

The net result is that the candidate stream C is reduced to a boosted stream B ($|B| \leq |C|$). The higher the threshold T the smaller B compared to C. The ratio between the size of B per the size of the source C is regarded as the clearing ratio of the RandoBoost:$|B|/|C|$.

If C is of high quality of randomness then very few if any string sections will be discarded, namely we will have $|B| \rightarrow |C|$. If C is of poor quality then $|B| << |C|$. The ratio $|B|/|C|$ indicates the quality of the candidate stream. The RandoBoost will compute this ratio as the output of the RandoGauger.

If C is an arbitrary string of no special claim for randomness then it too will generate a high quality output string B, only that B will be much smaller than C. If C is highly non-randomized, with distinctive pattern, then $|B| \rightarrow 0$, there will be scant or zero output.

By fixing the RandoBoost/RandoGauger right before the randomness consumer, one will be able to spot a variety of attacks. Most audacious attack is the 'man in the middle' where a good quality candidate stream C is replaced with a poorly randomized candidate string C'≠C, and then taking advantage of this input down the road in the crypto protocol. By switching C with a good randomness candidates or by making a copy of C, the attacker still may not know how C will be chopped down to B.

The size of the $s_1$, $s_2$, . . . strings may be uniform $|s|=|s_2|= \ldots |s_n|$, except the last that might be smaller. Or the sizes of these strings may vary according to some rule, or randomly. The source of randomness to vary the size of the randomness analyzed strings may be the B output itself, creating a strong feedback cycle to enhance the randomness.

Functional Design

The RandoBoost and RandoGauger are constructed as an assembly of the following parts:

1. Randomness Evaluator (RandoEval) 2. Randomness Separator (RandoSep) 3. Input Accumulator 4. Output Accumulator 5. RandoBoost controller 6. Input and Output ports The RandoBoost may be implemented in hardware, or in software. It is a unit with two inputs and two outputs. The main input stream of bits—the candidate stream, C is operated on by the RandoBoost based on guidance from operation control input, G. The main output stream of bits, B, is the boosted randomness stream, the object of the operation. Strings of bits that are discarded are optionally routed to an analyzer for further inspection, or they may be simply discarded.

The input and output accumulators are designed to decoupled the operational speed of the randomness analyzer operation from the rate of incoming candidates bits and the rate of consuming the product bits. The accumulator provide some capacity relief for such decoupling.

The randoboost controller will set the threshold for the next string to be analyzed and the size of that next string. These values can be pre-programmed, can be reset through a guidance port coming from the outside. That guidance can have a randomness source that may be internal, external, or may be the randomness generated by the system itself.

The output randomness, as well as the candidate randomness may be communicated via a physical port, via Bluetooth, NFCor WiFi, or other ways.

The size of the next string to be analyzed for randomness level may be changed from string to string, or may be fixed, as the case may be. The non qualifying strings are either discarded or routed for further analysis.

Operational Modes

1. Basic Mode 2. Amplified Mode 3. Feedback Mode 4. Unilateral versus Coordinated Mode.

In the basic mode the RandoBoost uses a fixed string size and a fixed randomness threshold to operate. In the amplified mode the size of the evaluated string is controlled by some operational input information and so is the threshold. The dynamic nature of string size and threshold changes the nature of the output string B, relative to the input string C.

In the Feedback mode, the output randomness stream B, is used in part as operational input to control the strings size and the threshold, for every round of randomness evaluation.

In a unilateral mode the output string is not coordinated with anyone else. In a coordinated operation, there are at least two parties that are expected to generate the same output bit stream B, given the same input string C. This can be done if (i) input stream C is available to both parties and if (ii) both parties use exactly the same operational input to control string size and randomness threshold levels. The input stream C may be sourced by a third party accessible to the communicating parties or it may be generated by one party and passed to the other.

Spectrum of Randomness

There are several situations where a need arises for gauged randomness, namely for a stream of information which has a degree of unpredictability which is less than the boundary case of 'perfect randomness', but more than a perfectly predictable, fixed pattern stream. The underlying methodology in this invention assigns an objective index of randomness to any given bit string. This will allow one to take in a stream of random bits, and separate from that stream a gauged band of strings with randomness measured from low boundary $\rho z_l$ to a high boundary $\rho z_h$. All strings that dont fit into this interval will be discarded. The output string B will be comprised only of bit strings that fall, inside the $\rho_l$-$\rho_h$ interval. One could also divide an arbitrary input bit stream C according to their randomness readings, resulting in arbitrary divided stream, each with its randomness attributes.

Psychological research has found that people like to absorb information with a gauged balance between predictability and unpredictability. It's the reason people listen to music on a radio channel. Most channels identify the genre, the style, but the actual choice of songs appears unpredictable, randomized. Listeners to, say, pop music, don't expect classical piano to be the next piece—that would be too much unpredictability. Same for books, or movies, viewers and readers expect to be surprised but within limits. When more and more entertainment and teaching material is forwarded to consumers via artificial intelligence, the more important is it to generate gauged randomness feed stream to accomplish that. A simple application would be noise music, like 'forest noise', or 'ocean noise' which can be generated using gauged randomness.

The general idea of spectrum of randomness may be used to gauge changes in an arbitrary stream of bits.

Applications 1. upgrading randomness 2. randomness sources evaluation. 3. security alert 4. secure communication 5. subrandomness applications 6. relative randomness applications Randomness Source Evaluation A given source of randomness is readily evaluated through the ratio between the bit flow of the boosted stream, output stream B and the incoming candidate stream C. The lower the ratio, the poorer the source.

This simple procedure can be used to appraise algorithmic pseudo randomness, and physical randomness generators. One may recall that the booster will generate the same output quality from various quality of input Only that the output flow relative to the input flow for low quality input streams will be very low, because many evaluated strings will be discarded.

One may also note that an input stream C may be of such poor randomness (such high symmetry) that the output stream, B. will dry out. There will be no strings that qualify above the set threshold.

The input evaluation may be dynamic. So if a source either deteriorates (mostly for physical sources) or is compromised then the quality of the candidate stream will drop and this should set off an alarm.

The randomness evaluator will readily compare algorithmic sources for randomness. Each string of a decided size from the candidate stream generated from a given algorithm will be evaluated for its per string randomness. The evaluated strings will be mapped as a histogram. Two histograms of two algorithmic sources for randomness will be compared to be relatively evaluated.

The technique here will also operate on the full spectrum of randomness, including mild randomness, offering early alert for content changes.

Homomorphic Content Change Alert

Many bit streams in cyber space exhibit a rather stable measure of randomness, varying between two high and low limits. It is reflected in the randomness metrics probability curve per a given string size into which the bit stream is chopped. Whenever this randomness profile of the stream changes, it likely reflects an unusual change in content. Such change in content may be of great interest to a surveyor of that section of cyber space. By processing such stream through the RandoGauge, upgraded to a RandoProfiler, one monitors the signature of the analyzed stream without otherwise violating privacy or interpreting content. Upon detecting a major change in that signature the RandoProfiler will send an alarm and draw attention to this dynamics. The RandoProfiler works by analyzing and tabulating every successive string of a given size within the incoming stream.

Security Alert

Analysis of discarded strings, as to how far from perfect randomness they are and how frequent, will indicate whether something happened with the source of the candidate stream. Any compromise or undue interference with that stream will be captured as a change in the level of randomness and frequency of the discarded strings.

Randomness Intrusion Detection

Cyber security attacks are largely based on undetected intrusion in the normal data flow of the attacked system. The inserted malware tries to blend in. Cyber defense is based on means to detect the intrusion. Most of the data traffic in networks is not highly random, but not perfectly predictable. It is sub-random, or mild-random. This limited measure of randomness is exploited by hackers to pass their malware as bona fide traffic.

The methods in this invention can be helpful for detection of such intrusion. Mild randomness may be measured and monitored. Malware will modify the degree of randomness in the inspected stream, and good monitoring will expose it.

We discuss two modes of operation: (i) low threshold monitoring, (ii) relative randomness monitoring.

Low Threshold Monitoring

Normal texts and pictures flowing through the net are typically mild-random. By applying the RandoGauger with a sufficiently low threshold, a given stream will have a clearing ratio (|B|/|C|) at a desired level. If the recorded clearing ratio is too high, then the cut off threshold may be moved higher. If the clearing ratio is too low, then then the threshold level can be put lower.

An attractive randomness threshold corresponds to a clearing ratio of 50%. In this case there will a maximum variation to detect both an increased randomness and a decreased randomness. In simple operation one will intercept a channel to be inspected, or copy its stream, and analyze it per its clearing ratio over a given arbitrary threshold. Then keep reading the channel flow, and keep checking the clearing ratio as flow continues. If the clearing ratio changes much, it is cause for alert for some malware introduction to the channel.

This procedure can be upgraded from the simple clearing ratio to the full fledged randomness frequency curve:

Operation: a communication channel is either intercepted, or copied to a RandoGauger. First phase, the RandoGauger uses arbitrary fixed string length and runs evaluation of the incoming stream, string by string as to its randomness index, ranging from 0 to 1. The results of some n evaluated strings are mapped into a randomness frequency histogram that creates the "signature" of the inspected steam. This initial signature is kept in memory. The inspected stream is then further evaluated over the next m strings (of same size as before), and the randomness readings of these m strings are mapped into a new m-histogram. The two histograms (the original n-histogram and the new m histogram) are evaluated for similarity. If they are sufficiently similar (using any of the many common statistical metrics), then no alert is raised. If the m-signature is vastly different from the original n signature then an alert is raised for someone to look into this channel for possible intrusion.

Since most intruders will use high randomness malware there is greater chance that the intruded stream will show higher randomness.

Relative Randomness Monitoring

In this mode one will analyze an inspected communication channel as follows:
1. take in a large enough cut from the incoming channel, say n bits, called the reference sample.
2. Search for a good framework for the reference sample, and identify it.
3. Construct the randomness frequency curve (the signature) for the reference sample, called the reference curve.
4. Record the next m bits from the inspected communication channel, and use the RandoGauger to build the signature, the randomness-frequency curve, for these m bits.
5. Compare the reference curve to the here constructed m-curve. If the signatures are similar, then no alert is raised. If the signatures are markedly different then alert is raised.

What is a Good Framework for the Reference Set?

A good framework is a framework that is small and still leads to a randomness frequency curve which shows low randomness for the reference set. This is because malware is rarely humanly readable for its purpose (low randomness), and is usually encrypted so it reads with high randomness. Intruders hope that the randomness of their malware will blend with the rest of the channel flow, and that is where the RandoGauger test may come in to successfully detect such blending attempt.

The RandoGauger relative randomness method will work even if the chosen framework is not the optimal. The optimal framework has theoretical advantages.

See ahead for explanation of the concept of randomness framework.

Secure Communication

Two parties sharing secret RandoBubbler devices will be able to each generate the same stream of output randomness which the parties can then use for any mode of communication like Vernam cipher, or the Unary cipher. The RandoBubbler may be operated on the basis of secret guidance, or on open guidance relying on the need to have possession of the physical device in order to generate the output.

The parties could first calibrate their operation. One party will send an initial output stream $B_0$ to the other, in the open. The second party will compare what the first party sent to what it generated with its own device and will send OK signal to the sending party, if the comparison is good. Otherwise the sending party will stop, restart and try again. Exposing $B_0$ will not compromise the following output to be shared in secret. The secrecy will be preserved even if the two communicating parties will share in the open the attribute of the RandoBubble to be used in generating the output.

Another mode of communication is through a public source of a candidate stream. The two parties will use a pre-shared guidance information for how to process the candidate stream C into an output stream B. Here too, the parties would be able to validate their coordination by sharing in the open a section $B_0$ of the output stream from the public stream C. If the outputs are the same, then they can use their secret guidance to operate on the next flow from the candidate Stream.

The guidance information may refer to string size and to threshold. The parties will agree to set the threshold between $T_l$ low value to an arbitrary high value $T_h$, and set a threshold interval $\Delta T$. This implies $\theta=(T_h-T_l)/\Delta T$ allowed variations for the threshold. (for a fixed threshold resolution).

Similarly the parties will decide on a low size of evaluated string $s_l$ and a high value of evaluated string $s_h$. This will set a string size variety $z=s_h-s_l$.

When the candidate stream starts to flow the RandoBoost will chop $s_1$ bits to form the first string, and evaluate this string per the first threshold level $T_1$. Similarly for the second, third, and the i-th string will be formed from $s_i$ bits and evaluated over $t_i$ threshold.

Each evaluation will decide whether the analyzed $s_i$ bit size string qualifies for the output or needs to be discarded. The various sizes may be preset so that size i is not i bits long but any other number of bits $r_i$. If the average of the $r_i$ sizes is q, then that is the average size of the analyzed message. It is analyzed with the help of data of size θ*z, which can be expressed with w=log(θ*z) bits. Suppose that the threshold and size values are gauged such that every analyzed string has a 50% chance to be discarded, and 50% to be added to the stream. In that case by consuming w bits the RandoBoost will generate 0.5q bits of secret output stream. Since the size of q is arbitrary then the ratio of secrets bits generated 0.5q to secret bits used, or consumed, w is 0.5q/w, which is as high as one desires.

Relative Randomness Applications

Relative randomness is an abstraction of the symmetry based definition of randomness, and it can be exercised using the RandoSolution. Let's consider t bit strings of base size b bits per string, and refer to this set of t strings as a randomness framework, F. The strings of the framework are identified as $f_1, f_2, \ldots f_t$. Lets also consider an analyzed string A of size a bits where a>b.

In general a framework can be defined via t elemental strings of various sizes, not a uniform size as described above.

The elements $f_1, f_2, \ldots f_t$, may also be regarded as base alphabet with which to write strings of any size larger than the largest letter in the alphabet.

Let us further define a set of construction rules, CR by which the t elements of the framework may be assembled to construct the candidate string A.

Let s by the smallest number of framework strings that are needed in order to construct A from the framework F in adherence to the rules of CR. The smaller the value of s, the less relative randomness of A with respect to F.

If the size of A is a multiple of b, and if the basis framework F is 'complete' then s=|A|/b for all A. Complete means that $t=2^b$. In that case there is no randomness variance between the various strings.

For a complete case for t=1 (f1=0, f2=1), we have s=|A| for all strings A, again no variance of randomness between the possible strings. In between there is variance.

Relative randomness assigns randomness values to strings based on a framework of elemental substrings, the 'framework'. A string A will have relative randomness ρ(A, F1) on the basis of framework F1, and a different relative randomness value ρ(A, F2) based on framework F2. In general, for F1≠F2, we have ρ(A, F1)≠ρ(A, F2).

For a string of bits A one could ask what is the framework comprised of t strings b bits each such that for that basis the relative randomness of A will be maximum or minimum.

A stream of incoming bits, candidate stream, C may be boosted according to relative randomness framework F, generating a boosted stream B(C,F) comprised of strings that are of high relative randomness as viewed from F. Similarly any defined interval of sub-randomness can be extracted from candidate stream C to generate an output stream B comprised of substrings that comply with the relative randomness interval.

This relative randomness concept may serve as basis for secret communication based on a shared framework. Accordingly a candidate input stream C will be shared in the open by two parties. C can be issued by a third party and taken in by the two parties, or it can be sent in the open, exposed, by one party to the other. The two parties will share an interval of randomness and randomness framework. Based on this shared secret both parties will boost the candidate stream C to the same output stream B. Any third party not privy to F and or to the interval of desired randomness will not be able to process C to B. Since a framework F can be of a large variety as to the values of t and b and the contents of the t substrings, the walk-back from a product that used B, or even from a somehow known pair of B and C back to F is impossible because of equivocation. There are numerous frameworks that will process a given C to a given B. So one pair of B and C will not lead to exposure of F. In each case there would be a relatively large number of framework options to fit into many pairs of C and B, so that equivocation lingers through much use of the same key.

Illustration for Relative Randomness

Let a framework F be defined with a certain b and a certain t as follows: f1, f2, . . . $f_t$.

Let the construction rules, CR be as follows: Let M be a matrix of size h*a, where h is any positive integer, and a is the bit count of the constructed string A: a=|A|. Let one or more of the framework building blocks f1, f2, . . . ft be placed in a non overlapping manner in each of the h rows of the matrix. A particular placement P of the t building blocks of F over M will be called 'compliant' if it complies with the following rule:

XORing the bits in column i on M yields the bit value that is written in bit i in A. So, for column i (i=1, 2, . . . a), XORing the h bits on column i in M will yield the bit written in position i in A.

Let π be the set of complaint placements of framework building blocks in M. Let P1 be the placement of M such that the number of framework building blocks used in that placement is the smallest among all compliant placements. The number of such building blocks will be s (the smallest number of building blocks).

One would compute the relative randomness of A per framework F based on the value of σ.

σ is defined as (a+δ)/b, where δ is the smallest number among 0, 1, 2, . . . (b−1) such that a+δ will be divided by b without remainder.

Based on the above the relative randomness of A per framework F will be given by:

$$\rho(A,F)=1-s/\sigma$$

As constructed we have 0≤ρ(A,F)≤1. The more framework building blocks needed to construct the analyzed string A the more non-pattern it is, the greater its randomness as seen from this particular base.

Numeric Illustration

Let F be set up with b=3 and t=3 and f1='110', f2='001', and f3='000'.

Case 1: A=110001000, a=|A|=9

We can build matrix M with h=1 as follows M=f1–f2–f3=110 001 000 s=3, σ=a/b=9/3=3 hence:

$$\rho(A,F)=1-s/\sigma=1-3/3=0$$

Zero randomness because this particular A can be constructed with the minimum possible number of framework elements.

Case 2: A=110111000

By trying the possibilities one arrives at a matrix M constructed as follows:

h=2 (two rows). lower row: f1, f3, f3, upper row: f2 started at position 2, f1 starting at position 5:

```
X 0 0 1 1 1 0 X X
1 1 0 0 0 0 0 0 0
─────────────────
1 1 0 1 1 1 0 0 0
```

X represents an empty matrix cell. By XORing the two rows column by column one gets the analyzed string A. This is the smallest count of framework building blocks needed to construct the analyzed string A, so s=5 (three building blocks for the lower row, and two for the upper row). Hence:

ρ(A='110111000'; F(110,001,000))=1−σ/s=1−3/5=0.40

Case 3: A=101011100.

By trying the possibilities one arrives at a matrix M constructed as follows:

h=4 (four rows). lower row: f1, f3, f1 2nd row from bottom: f1 from position 2, f1 from position 5; 3rd row: f1 from position 7; row 4th row (top): f2 from position 5, shown as:

```
X X X X 0 0 1 X X
X X X X X X 1 1 0
X 1 1 0 1 1 0 X X
1 1 0 0 0 0 1 1 0
─────────────────
1 0 1 0 1 1 1 0 0
```

Seven instances of use of framework building blocks in this case: s=7 hence:

ρ(A='101011100',F(110,001,000))=1−σ/s=1−3/7=0.57

The third case has the highest randomness on the described base framework, and the first case has the least, zero randomness on the basis of the described framework.

Review of the Invention

This invention describes: 1. A device for generation of random bits comprising: a fluid container, one heavy fluid of electrical conductivity $R_h$, and one light fluid of electrical conductivity $R_l$, such that $R_h \neq R_l$, a pump to pump the light fluid from the bottom of the fluid container to its top a bubble generator apparatus that forms rising bubbles of the lighter fluid with the bulk of the heavier fluid, an electric circuitry comprising: (i) two electrodes placed inside the fluid container such that current through the mixture of the fluid is closing the electrical circuit, (ii) electronic measuring elements to measure the value of the current in the electrical circuit over time, (iii) a computing element to extract a stream of bits from the readings of the electrical current over time, wherein the pump moves the light fluid to the bubble generator, which is placed beneath the fluid container, then the bubble generator generates rising bubbles that climb through the bulk of the heavier fluid in the fluid container, the bubble generator generates bubbles of various size, at various locations, and at various frequencies, thereby the fluid that separates between the two electrodes changes in composition from one instance to the next, and since the two fluids have different electrical conductivity values, the measured electrical current over time does fluctuate, The fluctuating electrical current is captured by the electronic circuitry in the device, this circuitry extract randomness from the fluctuating current as follows: selecting an arbitrary time interval Δt, the electronic circuitry reads the value of the current at the beginning instance of the interval, $I_b$, and at the ending instance of the interval, $I_e$; if $I_e \geq I_b$ then a bit valued "1" is generated by the electronic circuitry, if $I_e < I_b$, then a bit valued "0" is generated by the electronic circuitry, this process continues over the next time interval Δt, and so more bits are generated and routed to a port from where they are communicated to the consumer of the random sequence of bits.

2. The system in item 1 where the lighter fluid is air, pumped through a liquid.

3. The system in item 1 where the lighter fluid and the heavier fluid are in a closed system and the lighter fluid circulates from the bubble generator to the top surface of the heavier fluid and from there is circulated back to the bubble generator.

4. The system in item 1 where the bubble generator is constructed as a series of rotating discs which rotate perpendicular to the fluid flow, and where each disc rotates at a speed controlled by the electronic circuitry and where in each disc holes are drilled, where the holes are at various locations, and various sizes, and where the discs rotate next to each other, and where the pump moves the lighter fluid towards the disc apparatus from the bottom, and where as the discs rotate there are instances where the holes in the various discs do align, and allow the lighter fluid to escape upwards towards the bulk of the heavier fluid that is placed on top of the bubble generator; as the disc rotate the alignment that allows for the light fluid to escape upwards is disturbed and no more light fluid is escaping from that location, the escaped light fluid then, forms a bubble that rises through the bulk of the heavier fluid, and where based on the rotation regimen of the discs and their holes, at various locations and various times, bubbles of various sizes are generated and rise through the heavier fluid, resulting in fluctuating electric resistance within the mix of the fluid in the volume between the electrodes in the fluid container, resulting in a fluctuating current.

5. The system in item 1 where the random out is used as guidance for the electronic circuitry to vary the rotation speed and the direction (clockwise or counterclockwise) of each of the discs in the bubble generator.

This invention also describes 6. a method to assign a raw index of randomness to an arbitrary bit string A, comprising n>1 bits as follows: one arbitrarily defines terms of symmetry for bit strings, one regards an arbitrary string A as symmetric if it complies with at least one of the defined terms of symmetry. If A is symmetrical then the raw randomness of A is 0: R(A)=0. If A is not symmetrical then one divides A to all possible combinations of two concatenated substrings: $S_1$, $S_2$: A=$S_1$∥$S_2$, and if any such combination is such that the two substrings are both symmetrical then the raw randomness of A is R(A)=(2−1)/(n−1), if no combination of two substrings is such that the two substrings are both symmetrical, then one divides A to all possible combinations of three concatenated substrings $S_1$, $S_2$, $S_3$: A=$S_1$∥$S_2$∥$S_3$, and if any such combination is such that the three substrings are all symmetrical then the raw randomness of A is R(A)=(3−1)/(n−1), if no combination of three substrings is such that the t−1=3 substrings are all symmetrical, then one divides A to all possible combinations of t concatenated substrings $S_1$, $S_2$, ... $S_t$: A=$S_1$∥$S_2$ ... ∥$S_t$, and if any such combination is such that the t substrings are all symmetrical then the raw randomness of A is R(A)=(t−1)/(n−1), one continues iteratively incrementing the number of substrings that concatenate into A until one, computes the raw randomness of A.

The invention further describes: 7. The method in item 6 where a string of bits A comprised of n bits $a_0, a_1, \ldots a_{n-1}$ is considered symmetrical if it complies with any of the following terms:

(i) shift symmetry: there exists a positive integer s such that by shifting $a_i$ to position where $j=(i+s) \mod n$ for $i=0, 1, 2, \ldots (n-1)$, one writes a string A' which is identical with A: A=A'

(ii) rotation symmetry:

for an even n, when one moves the bit in position $0.5n-1-i$ to position $0.5n+i$, while the bit in position $0.5n+i$ is moved to position $0.5n-1-i$, for $i=0, 1, 2, \ldots (0.5n-1)$, and thereby one writes a string A' which is identical to string A: A=A'.

for an odd n: when one moves the bit in position $0.5(n-1)-i$ to position $0.5(n-1)+i$ while the bit in position $0.5(n-1)+i$ is moved to position $0.5(n-1)-i$ for $i=1, 2, \ldots 0.5(n-1)$ one writes a string A' which is identical to string A: A'=A (iii) exchange symmetry: for odd n when one moves the bit in position i to position $0.5(n-1)+i$ while the bit in position $0.5(n-1)+i$ is moved to position i, for $i=0, 1, \ldots 0.5(n-1)-1$ one writes a string A' which is identical to string A: A'=A (iv) singular symmetry: for n=1 A is considered symmetrical.

The invention further describes: 8. The method of claim 6 wherein the nominal randomness of string A is computed as follows:

let $\alpha$ be the set of all strings of size n bits, let string A* in $\alpha$ be a string for which the raw randomness is the highest: $R_{max}$, let this case correspond to the division of A to m concatenated substrings, one would compute the nominal randomness of A as $\rho(A)=(t-1)/(m-1)$ The invention further describes: 9. The method of claim 6 where the string A is comprised of n symbols, where three or more of them are distinct.

The invention further describes: 10. A method to assign a relative index of randomness to a string A comprised of n bits on the basis of a framework F defined as:

h substrings $f_1, f_2, \ldots f_f$ each of bit length b, a set of construction rules, CR, that specify how to put together a set of the substrings with repetition allowed, so as to construct A, then assigning the relative randomness of A: $\rho*(A)=1-n/t$, where t is the smallest number of substrings that will construct A according to the construction rules CR.

RandoPal: Personal Randomness Generator

Ad-Hoc, Non-Algorithmic Randomness Generated on Demand to Gas-Up Cyber Security Tools, Insuring Privacy and Confidentiality The emerging wave of cyber security tools are feeding off large quantities of high quality, hacking-immunized randomness. Proposing the RandoPal, a battery operated small, simple, carry-on device with sufficient throughput of high-quality randomness to be used in conjunction with randomness-powered ciphers and cyber security tools. The source of the randomness will be physical measurement, optionally with an iterative upgrade, and possibly with a built in quantum grade randomness. The RandoPal may be hard connected to the user's computer, or it may operate via a secure WiFi, Bluetooth, or NFC, serving possibly more than one user. An office-level RandoPal (RandoPal-O) will generate a throughput to serve an entire office of users.

Introduction

What is new today, over the practice of cryptography, is the idea that security can be generated not through mathematical complexity, but rather through user-control injection of high-quality randomness. What makes it even more compelling is the fact the modern ciphers allow their user to deploy unilateral randomness in pursuit of security of their message. Namely, by throwing in randomness which has not been pre-shared (unlike a cryptographic key), the transmitter projects as much security as they desire. This randomness-built up security will go as high as desired up to perfect mathematical secrecy, where no cyber attacker has any prospect of successful cryptanalysis regardless of the tools in their disposals.

In light of this new cyber security reality, there arises a need for a handy personal source for sufficiently high-grade randomness, generated a a sufficient throughput.

We distinguish between three sources of randomness: algorithmic, measurement complexity, microcosmic randomness. The first was condemned by no lesser authority than Von Neumann, who said that anyone maintaining that randomness can be generated by algorithms does not understand neither randomness, nor algorithms. The third is backed up by the most successful theory of nature ever: quantum physics. The in between category is—in between. Its perfection is not guaranteed and faint patterns may manifest themselves, yet by passing such randomness through a proper filter, the quality of the measurement complexity randomness can be increased at will.

Anatomy of the RandoPal

The RandoPal is comprised of:
1. The Randomness Generation subunit 2. The Power Supply Element 3. The Communication Element 4. The Container 5. Security Features The Randomness Generation Subunit The Randomness Generation Subunit may vary in complexity. The basic element is the environmental sensor, and its digitized output generation. The element may be upgraded by a randomized stimulator, that enhanced the random nature of the environmental feature measured by the sensor. The sensor may be further stimulated by a quantum-randomness seed (QRS).

Randomized Bubbles Apparatus

A randomized bubbles apparatus (RBA) is a device that outputs random data on the basis of conductivity measurements taken over an electrolyte solution through air bubbles are rising, as a result of an air pump operated randomly.

The output of the RBA may feed the air pump. The RBA is initiated randomly.

The stream of output random bits is continuous. It may be communicated through a hard wire, or through WiFi or Bluetooth or NFC, to serve a large community of randomness consumers.

The Generalized RBA

The air bubbles RBA may be generalized to gases other than air, and further generalized to any fluid for which the conductivity is different from the conductivity of the electrolyte solution. The electrolyte solution may be generalized to any fluid—as long as the two involved fluids have a markedly different conductivity.

RBA—Principle of Operation

The effective conductivity of an electrolyte solution depends on the chemistry of the solution, and the geometric configuration of the electrodes through which conductivity is measured along with the geometry of the container that holds the solution. When the system is at rest, the conductivity (or resistance) is stable.

When an air bubble is pumped into the bottom of the container of the electrolyte solution, and the bubble rises up to the surface of the solution, in between the measuring electrodes, it displaces electrolyte solution through which electrical current was flowing before the bubble showed up. Since the bubble is an insulator material, such displacement reduces the conductivity of the solution. When the bubble pops at the surface its volume is replaced with solution, and the conductivity rises again. When bubbles at various sizes rise at various locations their effect is a rising and falling of conductivity measurements.

While thermodynamics claims to be able to calculate the over-time conductivity of a solution given the bubbles regimen, such calculation is extremely complex, especially in a situation where many smaller bubbles rise and compound each other's impact. This complexity is further augmented by the complex relationship between operational parameters of the air pump and the resultant bubble regimen. The net result of this high complexity is that for all practical purposes the measurement of conductivity of the solution over time qualifies as random.

The RBA may be constructed as a decorative gadget.

The conductivity measurement over time may be translated to a stream of bits in any of the common ways. One such way is to agree on a time interval $\delta t$, and measure the conductivity every such interval. If a measurement is higher than a previous measurement then it reads, as bit 1, if the measurement is lower than a previous measurement then it reads as zero. If it is the same (to a pre-set tolerance of equivalence) then there is no reading.

The pumped bubbles may be ambiance air, or may be closed loop gas, or liquid.

The electrolyte solution may have to be replenished in any of the common ways, including electrode reversal.

Mathematical Foundation

Randomness Written in a Symmetric Alphabet

Review: Mathematics is about pattern, order, symmetry, and hence it views randomness as its boundary—being the expression of no pattern, no order, and no symmetry. And for not being included in the body of mathematics, randomness expectantly defies mathematical definition, as indeed is the case. Alas, because of its status as being one of the boundaries of mathematics, randomness deserves our approximation efforts, getting as close to this boundary as possible. Which is what we try here.

While Order, and Pattern are burdened by residual vagueness, symmetry is quite crisp: an entity E exhibits symmetry with respect to action $\alpha$, if it remains unchanged upon being operated on by $\alpha$ ($E=\alpha(E)$). We therefore choose symmetry as the property, the absence of which will signify randomness. The general idea is to express any mathematical entity as a combination of symmetric sub-entities, and evaluate its symmetry-randomness balance based on how few symmetric sub-entities are needed to construct it.

There are two categories for which such insight can be used: the "prosaic" applications where one strives to construct high-randomness entities by scrubbing them from any distinguished symmetrical ingredients, and the "poetic" applications where one strives to discern in a seemingly random entity—some large symmetrical components.

We start at the abstraction level of general mathematical constructs, then discuss particular construct: strings, for which we further narrow our discussion to generic symmetry, and point to non-generic symmetries to be discussed later.

Symmetry inherently boosts predictability, which is why for cryptographic applications we wish to remove its expressions, ("prose") and that is why it is of great interest to measure the extent to which symmetry is hidden in cryptographic products like ciphertexts.

Randomness may be viewed as the starting point of mathematics, which is the handling of order, the absence of which is the intuitive grasp of randomness. Being then the boundary of mathematics, it cannot very well be defined within its realm. Indeed the stubborn resistance to its definition is its intrinsic characteristics.

Mathematics in many a field is using a working definition of randomness, and builds upon it. It stands to reason then, that additional work in the area of definition might prove promising, which is the motivation for this article.

We will offer below a quick review of the various approaches to randomness, and how they leave room for different takes.

1.1 A Brief Review of Approaches to Randomness

One may discern three points of view for randomness: the writer's point of view, the reader's point of view, and the per-se point of view. The writer is the source that generates a random sequence. It regards the product (randomness) as generated without order, without algorithmic dictates. Accordingly a contraption like the one manufactured by IDQ in Geneva where a photon is shot towards a slanted half-way mirror and has 50% chance to go through, and 50% chance to bounce off, is considered a source of quantum-grade randomness. Here the randomness claim is based on the state of the art of physics, not on mathematics.

The reader's point of view is taken through the ability of an examiner of a random sequence to draw conclusions, to discern pattern, to use for some added predictive value and in particular to correctly guess missing data from existing data. Von Mises defined a bit string as random if given the first n bits therein, one cannot predict the identity of the (n+1) bit with probability larger than 50%. Such approaches involve a poorly defined 'reader' in the picture. It is impossible to distinguish between a true random entity, and an entity with a pattern too well hidden for a particular reader to discern. In practice to the extent that a series of random bits does not teach its reader any useful knowledge, it is considered properly random.

The per se approach is to ignore who writes the examined randomness, and similarly to ignore what one can learn from it, but rather examine the data per se, and issue a measure of its randomness. This approach is dominated by Kologomorov test: a string x that can be generated via a general purpose Turing machine from an input y, such that $|y|<|x|$, (y is shorter than x), is not random. It identifies then as random a string z that cannot be generated from a shorter one. More recently Per Martin Löf added widely acceptable randomness tests applicable to continuous random variables. These entity per-se definitions drive ambiguity to another corner: how to prove that no shorter string will generate a given string or how to ascertain how many truly random series are rejected as non-random. Also, these definitions bring up a question of the relevant alphabet. A string per se does not identify the alphabet from which it is drawn, and different alphabets may give different results.

Both writer and reader approaches resort to probability calculus. The central idea is that every letter in a random string is independently determined and has a 1/b chance to be of a given identity (where b is the number of letters in the relevant alphabet). This assumption leads to numerous possible randomness criteria. Any string of letters s, may be judged as random if any given proper subset, $p \subset s$, appears in s, "close enough" to its expected value. Only that this is impossible for all possible subsets p.

The common denominator for the various approaches is the completely informal test: consistency with the intuitive grasp of the notion of randomness. All the methods are an attempt to placate this intuitive grasp, but they all do so with arbitrary assumptions and constructs. Being the border of mathematics, pattern, and order, and not as part of it, keeps randomness inherently a target of ever more approximate means to rate and gauge it. This also implies that there is room for more novel approaches. And this need for ever better, ever more useful means to rate randomness, has become more acute recently, as randomness is rising in an ever growing number of fields, from Monte Carlo applications, socio-economic issues, computer security, and artificial intelligence.

2.1 Symmetric Metric of Randomness—Mathematical Abstraction Level

Given that symmetry is a very clear expression of order, its absence can be interpreted as an expression of randomness. We consider a mathematical construct E, and an associated operator $\alpha$ which may operate on it: $E'=\alpha(E)$. If $E'=E$, we consider E symmetric with respect to $\alpha$. We define the symmetric index (marker) of E as: $E^s{}_\alpha = \{0,1\}$, where 1 indicates that E is symmetric with respect to $\alpha$, and 0, otherwise. We define a set of unit entities: $U=u_1, u_2, \ldots$ and an addition (+) function, such that E can be expressed as an addition of some or these units: $E=\Sigma u_i$, $i=1, 2, \ldots t$. We set for every $u_i$: $u_i^s{}_\alpha = 1$, namely we define a unit entity as inherently symmetric. Hence E may be seen as comprised oft unit entities for which $\Sigma u_i^s{}_\alpha = t$.

Applying the selected addition function over a subset of the t unit entities that add up to E, we define an E subentity $e_j = \Sigma u_i$ for $i=1, 2, \ldots t'$ ($t' \leq t$). We can then write entity E as comprised of subenttities $E=\Sigma e_i$ $i=1, 2, \ldots q$. We construct this structure such that operator alpha is defined over each subenttity $e_i$, which can be either symmetric or not: $e_i^s{}_\alpha = \{0,1\}$ There may be many ways to assemble the t' unit entities to comprise E to q subentities. For each of such assemblies we can define the 'symmetric count' of E as: $\sigma^*(E) = \Sigma e_i^s{}_\alpha$ for $i=1, 2, \ldots q$. Clearly $\sigma^*(E)_{max} = t$, which is the case where for all possible subentities $e_j$ that are comprised of two or more unit entities we have $e_j^s{}_\alpha = 0$.

The interesting question here is the smallest value for $\sigma^*(E)$. For some combination of unit entities there may be subentities of large number of unit entities and for them there is a symmetry with respect to $\alpha$ (all relative to the well defined addition function that dictates how unit entities assemble to subentities, and how subentities assemble to the entity). For E with respect to $\alpha$, symmetry is a binary choice $\{0,1\}$. However if E can be comprised of q subentities such that each of these entities is symmetric with respect to $\alpha$ then to the extent that q<t then E is more 'symmetric' with respect to $\alpha$. In other words, let $E_1$ and $E_2$ be two entities, such that each is comprised of some unit entities $u_1, u_2, \ldots$ $E_1$ is comprised of $t_1$ of such units and $E_2$ is comprised of $t_2$ of such units. Let's first examine the case where $t=t_i=t_2$. In that case if $q_1<q_2$, then $E_1$ is comprised of larger subentities (and so fewer of them) which are all symmetric with respect to $\alpha$, or say: $E\ e_1^s{}_\alpha < \Sigma e_j^s{}_\alpha$ where i summarizes the subentities for $E_1$ and j summarizes the subentities for $E_2$. This implies that $E_1$ is comprised of fewer (and larger) subentities that are all symmetric with respect to $\alpha$. And being more symmetric implies being less random. We therefore can define symmetric metric for randomness in the form:

$$\rho_\alpha(E) = (\Sigma e_i^s{}_\alpha - 1)/(\Sigma u_i^s{}_\alpha - 1)$$

$\rho_\alpha(E)=0$ is the case where $E^s=1$ namely E is itself is symmetric with respect to $\alpha$, and $\rho_\alpha(E)=1$ in the case where q=t, or the case where any addition of the unit entities that comprise E is asymmetric with respect to alpha. Or say, the only way to express E as a combination of symmetric ingredients is to regard E as a combination of its unit entities. Since no subentity larger than the unit entities has symmetry with respect to $\alpha$. The specific form of the randomness formula is adjusted to map randomness on stretch from 0 to 1.

Justification: The proposed metric $\varrho$ (E) for the randomness of an entity E requires some arguments in favor of its validity. We consider a set of mathematical entities of the type of E, $\langle E \rangle$ of size $|\langle E \rangle|=g$. If E is drawn uniformly from $\langle E \rangle$, then its randomness value $\varrho$ (E) is inconsequential because every member of the set has the same chance (1/g) to be selected. However, if one knows the value of $\varrho$ (E), and tries to use this knowledge to guess the identity of E, then to the extent that highly symmetric entities are a minority, then knowledge of a low level or $\varrho$ (E) is very consequential.

Often times a random entity is selected in order to frustrate a guesser who knows parts of E, and make it harder on her to guess the missing parts. In that case high randomness (low symmetry) is a clear advantage, since symmetry creates predictability.

Normalized Symmetric Metric: The set U of all possible unit entities $u_1, u_2, \ldots u_m$, counting m units, may be larger than the number of such units needed to construct the subject entity E. $|E|<|U|$. In that case there would be some such strings for which the randomness metric $\varrho$ (E)=1 because then the only de-composition of E to symmetric subentities is through the unit entities, and hence $\Sigma e_i^s{}_\alpha = \Sigma u_i^s{}_\alpha$ leading to $\varrho$ =1. However, in the case where $|E|>|U|$, there will have to be duplication of unit entities in the construction of E. This might lead to a situation where for a given E expressed through such a set U, it is impossible to compose an E for which $\varrho$ (E)=1. For a given size |E| there would be various E entities with different randomness metric, which will have a maximum value $\varrho$ (E)$_{max}$<=1. Such entities will have a corresponding number $q_{max}$ of symmetric substrings, counted for each E as the smallest possible number for that E. This would lead to a normalized expression of randomness:

$$\rho(E)_{normalized} = \rho^*(E) = (\Sigma e_{i\alpha}^s - 1)/(g_{max} - 1)$$

2.2 Generic v. Tailored Symmetry

The choice of symmetry operators ($\alpha$), and addition function ($\Sigma$) may be made in two categories: generic and tailored. The former is aimed to explore generic, unspecified situations where the interplay of randomness and symmetries is regarded as promising mathematically and practically. Modern strategies for artificial intelligence is based on reducing human bias, and guiding AI agents with very generic principles, like use randomness lavishly and hunt for symmetries. Such symmetries are normally defined over shapes and geometric entities. Another avenue of generic symmetries relates to strings of symbols. Strings may exhibit a shift symmetry where rotational shifting of a string t steps ahead, leave the string unchanged.

By contrast, symmetric metric of randomness may be used as a tool of investigation a particular functional relationship for a particular aim. We see ahead an example of tailored symmetries used as a cryptanalytic tool.

2.2.1 Tailored Symmetries

We present a likely situation for tailored symmetry.

Consider a function f: y=f(x). Consider further an examiner in possession of n pairs $(x_1, y_1), (x_2, y_2), \ldots (x_n, y_n)$ of points satisfying f. The examiner, unaware of f per se, strives to extract it from its data. Lagrange has taught us how to use an n-degree polynomial to hunt for f. It's getting sticky for a large n. Let's now look at symmetry:

If x were symmetric with respect to f, then we would have: y=x=f(x), which is trivial. However, let there exist an operator, O such that we can find u entities $x^*_1, x^*_2, \ldots x^*_u$, all symmetric with respect to O: $x^*_i=O(x^*_i)$ for i=1, 2, ... u, such that: $x=\Sigma x^*_i$, where the $\Sigma$ sign indicates some well defined summation function.

Similarly for y: we have $y=\Sigma y^*_j$ for j=1, 2, ... v. such that $y^*_j=O(y^*_j)$ for j=1, 2, ... v.

It is possible that there would be a pair (i,j) such that $x^*_i=y^*_j$. And that such a fit represents a hidden symmetry that survives the 'onslaught' off on x. In that case given some value of x, the examiner will learn something about y, and there would be that much less to guess what y is. Because this conclusion is based on symmetry it works also in the reverse: given a value of y, the examiner will learn something about x, and will have much less to guess.

All this identifies an exploratory strategy: given n pairs of $(x_1, y_1), (x_2, y_2), \ldots (x_n, y_n)$ points, find an operator O, a summation function $\Sigma$, and a means to break down each $x_i$ and $y_j$ to symmetric components, such that a surviving symmetry will be identified.

2.3 String Symmetry

Let's now reduce the mathematical abstraction above to a specific entity, an arbitrary string of symbols. Let the above entity E be instantiated by an arbitrary string s: E=s, for which the unit entities will be the symbols that comprise the string. The abstract unit entities will be instantiated by the symbols that comprise the string. And any substring of s will qualify as a subentity of s: $s_1, s_2, \ldots$.

Strings are a sequence of n symbols, m≤n of them are distinct. There is no limit on the value of n, and m is free to "roam" from 1 to n. The set of all such strings is mappable to the natural numbers.

A string, s, will be regarded as symmetric with respect to operator $\alpha$, if s=$\alpha$(s). For example, a string s will be symmetric with respect to circular shifting oft symbols, if $u_i=u_{i+t}$ for all i=1, 2, ... n, where $u_i$ is the i-th symbol in s.

Let us agree that any string s where $u_i=u_j$ for all i and j is symmetrical because any operation a that qualifies for symmetry is by definition a permutation, and a string where all the symbols are identical is symmetric on any permutation.

Applying the above to the case where n=1, we conclude that all single symbols strings are symmetric.

Let $\alpha^*$ be the set of operators $\alpha_1, \alpha_2, \ldots$ such that s=$\alpha^*$(s) implies that at least for one of the operators $\alpha_1, \alpha_2, \ldots$ $\exists s=\alpha_i(s)$, for i=1, 2, . . . .

Given a certain $\alpha^*$, every string s may, or may not be symmetric. It is analogous to natural numbers which may or may not be prime. And much as primes exist even for large integers, so with respect to symmetric strings—they exist for every size of string. In building our analogy with natural numbers we may replace multiplication with concatenation, which we will regard as the abstract addition defined above. Every string s (where |s|=n>1) may be seen as a concatenation of substrings:

s=$s_1$||$s_2$|| . . . .

And every substring, $s_i$ (where |$s_i$|=$n_i$) can be viewed as a concatenation of its substrings.

Lemma 1: Every string s may be viewed as a concatenation of symmetric strings.

Proof: in the "worst" case any string s may be viewed as a concentration of its |s|=n single symbol strings (its unit entities), which are all symmetric.

Lemma 2: The number of symmetric substrings that comprise a string s is, q=SYM(s) is between 1 and |s|: 1≤SYM(s)≤|s|.

Proof: Every string s may be comprised of |s|=n repetitions of a single symbol, in which case SYM(s)=1, and also every string s may be comprised of n distinct symbols ($u_i \neq u_i \forall i \neq j$, or say a string where m=n) in which case every permutation will be asymmetric. And the same for any sub-string of size larger than one. Such string will have only one way in which to concatenate it from symmetric substrings: concatenating the n letters (unit entities) that comprise it.

While a string where m=n (called 'natively random' string) can be concatenated (=constructed) in only one way (concatenating the n=m different symbols that comprise it), an arbitrary string may be concatenated from different sets of symmetric substrings.

We are now ready to repeat the the abstract symmetry analysis on strings: Interpreting randomness as absence of symmetry, one would identify a string of size n comprised of m=n distinct symbols as 'natively random', or 'purely random'. Such string is associated with q=SYM(s)=n, the highest possible SYM(s) value.

By contrast, a string s which itself is symmetric is 'natively non-random', or 'randomness-free'. For such string SYM(s)=q=1.

For an arbitrary string s, we have 1≤q≤n. And q=1 represents 'zero randomness' and q=n represents 'full randomness'. We can express the randomness associated with other strings via the value of its q relative to its size n. Applying the symmetric metric formula derived in the abstract discussion, we write:

$$\rho(s) = \frac{q(s) - 1}{|s| - 1}$$

We will now further specify this string symmetry analysis with respect to generic symmetries, and then point out a non-generic instant, where this metric is geared towards cryptanalysis of certain symmetric ciphers.

2.3.1 Generic String Symmetry

At the general string symmetry level, we have identified the addition function as string concatenation, but have left unspecified the symmetry. Ahead we discuss 'generic symmetry. We identify three types: (i) shift symmetry, $\sigma_s$ (ii) rotation symmetry, $\sigma_r$, and (iii) exchange symmetry, $\sigma_e$. These symmetries will be defined below. Any string, s, may be symmetric with respect to any of these generic types: $\sigma_s(s)=\{0,1\}$, or $\alpha_r(s)=\{0,1\}$ or $\sigma_e(s)=\{0,1\}$. An arbitrary string s will be regarded as generically symmetric ($\sigma_g(s)$), if any of the generic symmetries is positive:

$$\sigma_g(S)=1 \text{ if } \delta_s(S)+\delta_r(S)+\delta_e(S)>0$$

2.3.1.1 Shift Symmetry

Let s by a string comprised of n ordered letters: $l_0, l_1, \ldots l_{n-1}$. These letters represent the unit entities discussed above.

Let $s'=R_t(s)$ represent a right shift oft rounds of s, such that:

$$l'_i = l_{i-t} \text{ for } i=0,1,2 \ldots (n-1)$$

where $s'=l'_0, l'_1, \ldots l'_{n-1}$, and where for i=k mod n $l'_i=l_k$.

If $s'=s$ then s will be regarded as shift symmetric string of degree t, or simply 'symmetric' string.

Illustration: s='AAAA' is symmetric with respect to t=1, 2, . . . ; s='ABABAB' is symmetric of degree t=2, and s='ABCABCABCABC' is symmetric with respect to t=3, 6. By contrast s='ABABABABABABABABZ' is asymmetric.

Lemma 1: ifs is symmetric of degree t then:

$$l_i = l_{i+t}$$

for i=0, 1, 2 . . . (n−1).

Proof: per the definition of symmetry $l'_{i+t}=l_i$, and since $s'=s$, $l'_{i+t}=l_{i-t}$, so we have $l_i=l_{i+t}$ Lemma 2: if a string s is symmetric of degree t given a right shift, it is also symmetric given a left shift.

Proof: if $s'=R_t^{right}(s)$, then $s=R_t^{left}(s')$ and vice versa.

Lemma 3: ifs is symmetric of degree t, then it is symmetric of degrees 2t, 3t, . . . kt, where n−kt≥0.

Definition: s will be regarded as symmetric of basic degree t*, ifs is symmetric of degree t*, and there exists a value i=0, 1, 2 . . . (n−1) such that:

$$l_i \neq l_{i+t^*-1}$$

In other words, s is not symmetric at degree t<t*.

Lemma 4: if s is symmetric with basic degree t*, then t*|n.

Proof: Suppose t* does not divide n. We can then write n−kt*<t* for some integer k. Since t* is the smallest degree of symmetry, then all the letters that comprise the set comprised of the t* letters that are being shifted, are all different, and hence the shift of t* letters will reorder one such t* substring and disturb the symmetry. Hence we must take it that t* divides n.

We concern ourselves now with the number of distinct symmetric strings defined over a string comprised of n letters drawn from an alphabet of m letters: $l_0, l_1, \ldots l_{m-1}$ Clearly the m strings $\{l_i\}^n$ for i=1, 2, . . . m are symmetrical with degree t*=1. For n prime, there is no t*>1 with respect to which any string s will be symmetric, as indicated by lemma 4. So for n prime the number of symmetric strings is m. We shall define the symmetry ratio, φ, of a string s of size n as the ratio between the number of symmetric strings to all possible strings:

$$\varphi(s||s|=n \ \& \ n\text{-prime})=m/m^n$$

and clearly;

$$\text{Lim } \varphi(s||s|=n \ \& n\text{-prime})_{n \to \infty}=0$$

If n is composite of the form $n=p_1^{q_1} p_2^{q_2} \ldots p_w^{q_w}$, where $p_1, p_2, \ldots p_w$ are the prime factors of n, by rising order $p_1<p_2< \ldots p_w$, then we can count symmetric strings of degrees $p_i, 2*p_i, \ldots q_i*p_i$ for w>1, and we can count symmetric strings of degrees $p_i, 2*p_i, \ldots (q_i-1)*p_i$ for w=1, for i=1, 2, . . . w. There are m, as well as counting any index t where t|n.

The largest possible t value is $n/p_1$. There are $m^{n/p_1}$ symmetric strings, and hence the symmetry ratio is given by:

$$\varphi(s)=m^{n/p_1}/m^n=1/m^{n(1-1/p_1)}$$

The highest symmetry ratio is for even numbers where $p_1=2$:

$$\varphi(s)=1/m^{n(1-0.5)}=1/n^{0.5}$$

which is quite a small ratio which approaches zero for larger strings:

$$\text{Lim } \varphi(S)_{n \to \infty}=0$$

And the smallest symmetry ratio happens when $p_1 \sim \sqrt{n}$:

$$\varphi(s) \sim \frac{1}{m^{n-\sqrt{n}}}$$

As can be depicted for the binary case, m=2:
The logarithmic graph shows the reverse peaks associated with prime numbers, as well as the general down trend that indicates that for larger and larger strings the probability of encountering a symmetric string is fast diminishing.

2.3.2.2 Rotational Symmetry

In addition to the shift symmetries, we may recognize rotational symmetries: Let a string s comprised of an even number of letters, n, be rotated around an imaginary axis placed between letter 0.5n and letter 0.5n+1. Accordingly, letter $l_{0.5n-i}$ becomes $l'_{0.5n+i-1}$ for i=−0.5n, . . . −1, and letter $l_{0.5n+i-1}$ becomes $l'_{0.5n-i}$ for i=0.5n . . . 1

Illustration: s='ABCDXYZW' where n=8, we rotate letter $l_0$ to become $l_7$, while $l_7$ become=$l_0$, same for letter $l_1$ exchanging places with $l_6$ to generate s'='WZYXDCBA'

For a string comprised of n odd letters, letter $l_{0.5(n-1)}$ will be regarded as the axis of rotation. Rotation will be executed by moving letter $l_{0.5(n-0+i)}$ to letter $l'_{0.5(n-1)-i}$ for i=−0.5(n−1) to 0.5(n−1).

Illustration: s='ABCXDEF', n=7, letter X will serve as the axis and letter A and F will exchange places, similarly letters B and E and letter C and D.

Much as the case with shift symmetry, if a string is left unchanged under rotation, it will be left unchanged under any number of rotations.

ziur

Examples for symmetries are s='ABCDEEDCBA', s='ABCDEXEDCBA'

2.3.2.3 Exchange Symmetry

Given a string s comprised of n even letters, then one can exchange the two halves (each comprising 0.5n bits). This exchange is identical to a shift operation with t=0.5n. However a similar exchange can be carried out over a string of n odd letters, where letter number 0.5(n−1) is regarded as the axis around which the two parts comprising each of 0.5(n−1) letters will change places. This will be a symmetric exchange, regardless of the identity of axis letter, as long as the two 'wings' (the two substrings of 0.5(n−1) letters) are identical.

Illustration: let s='ABCXDEF', n=7, 'X' will serve as the axis and 'ABC' and 'DEF' will exchange places. Similarly s='ABCDEXABCDE' is symmetric per this exchange.

2.3.3 Tailored String Symmetry

We focus here on a cryptanalytic environment where tailored string strategy is a promising tool.

Modem ciphers are tested against the risk of correlation between the ciphertext, C, and the key, K, over a range of plaintexts. And correlation can be used to rank order the key space to effect an accelerated brute force attack. So far though, the prevailing ciphers have not been tested against a correlation based on symmetric-randomness. Any such correlation will similarly be exploited for an accelerated brute force attack.

We write:

$$K_s = f_{cipher}(C_s, P_s)$$

Namely: the symmetry of the cryptographic key, K, ($K_s$) used to encrypt plaintext P via 'cipher', to generate ciphertext C, has a correlation function $f_{cipher}$, with the symmetry exhibited by C and P ($C_s$, $P_s$). Over a long run the symmetry of the plaintext steam is expected to be rather stable, so that the correlation is reduced to: $K_s = f_{cipher}(C_s)$. Since 'cipher' is known, an attacker can explore such symmetry based correlation over a range of possible symmetries. Again, since no cipher is likely to have been so tested, this might be a fruitful cryptanalytic strategy.

The search for productive symmetry correlations may be applied to elements within a cipher. For example, let's consider a given S-box comprised of 16*16 elements, and where each of the 16 combinations 0000-1111 will designated both columns and rows, and where the content is comprised of the 256 combinations of 8 bits. Any such S-box can be tested via a large number of plaintexts, exploring for any correlation between the input and the output, where the respective randomness metrics are compared.

AES is comprised of an effective matching table of every 32 bits string with some other 32 bits strings. This may lead to defining a symmetry of a bit string as a two step operation. The first is to apply the AES 32 bits exchange, over each block of 32 bits in the inspected bit string, then shifting right or left 32 bits. A bit string where each 32 bits block is preceded or followed by the AES matching 32 bits will be fully symmetric (zero randomized string) with respect to this definition.

The above point is illustrated in a smaller scale. Consider the following S-box:

|    | 00   | 01   | 10   | 11   |
|----|------|------|------|------|
| 00 | 0100 | 1101 | 0101 | 1001 |
| 01 | 1111 | 0110 | 1010 | 0010 |
| 10 | 1011 | 1100 | 0000 | 1110 |
| 11 | 0111 | 0001 | 1000 | 0011 |

Now consider a string:
s=0100111100111001110001100100101011010000
Let's parcels into 4bits blocks: s=b1, b2, b3, b4, b5, b6, b7, b8, b9, b10, b11=0100 1111 0011 1001 1100 0111 0010 0101 0110 1010 0000. It is easy to see that for i=1, 2, . . . 11, we have $b_i \rightarrow b_{i+1}$ per the S-box above, and b11→b0. Hence s is symmetric per the S-box transformation followed by a 4bits shift to the right.

We can readily apply this symmetry to the symmetric randomness concept: we should agree to regard each set of 4 bits as the unit entities, which are self-symmetric by definition, and then every bit string s will be seen as comprised of some m symmetric substrings $s_1, s_2, \ldots s_m$, some or all of them are unit entities. The count of the constituent symmetric substrings of s will fit into the symmetric formula together with the number of bits in s divided by four. Illustration let a string s' be defined as:
s'=01001111001110011100011100100101011010000-0011000110101111100111001110001100100101 01-101010000001001111

Upon ready examination s' can be seen as comprised of two symmetric strings, s and t with three single 4bits substrings between them and one 4 bit string trailing:
s'=01001111001110011100011100100101011010000-0‖0110‖0011‖0101‖1111 0011 1001 1100 0111 0010 0101 0110 1010 0000 0100‖1111=s‖ 0110‖0011‖ 0101‖t‖1111

We have seen above that s is symmetric, similarly one can verify that t=1111 0011 1001 1100 0111 0010 0101 0110 1010 0000 0100 is also symmetric per the same S-box, and hence s may be seen as comprised of q=6. (s, t and 4 singular 4 bits strings), while the number of 'letters' namely 4bits strings is: 26. and hence ρ(s')=(6−1)/((26−1))=20%, while ρ(s)=ρ(t)=0.

2.3.4 Symmetric Binary Strings

The contents of every string comprised of however many symbols may be expressed via a respective binary string. Which is why binary strings deserve special attention.

We first illustrate: let's consider a string s=10001110011100011110011000111100001110100101010, comprised of 47 bits |s|=n=47. The smallest number of symmetric sub strings that comprise s (q) is 10:
s=1~0~0011100~1~11000111100110001111100~00~11~101001010~1~0 which evaluates to ρ(s)=20%

The following 30 bits string: 011000010 111100111000001010110 breaks down to a smallest number of symmetric substrings of Count 10: ρ=31%~ 0~1~100001~0~1~1110011100~00~010101~1~0

By evaluating the symmetry of all $2^{30}$ strings of same size one finds out that q=10 as above is the maximum number concatenating substrings, as exemplified below: String $s_1$=010111010101110010001100101000 has a smallest number of concatenated substrings 5, so ρ($s_1$)=(5−1) (30−1)=14%. Similarly $s_2$=011110101001001111000 110101010 divides to no less than 7 symmetric substrings: $s_3$=100001010011000010011010110001 divides to no less than q=8 symmetric substrings, and $s_4$=110010111011 001111101110011001 divides to 9 as the smallest count of symmetric substrings: By contrast $s_5$=0101010101010 10101010101010101 will have q=1. We can thus write down a table of randomness rating both regular or "raw" and 'normalized':

|    | q | ρ    | ρ*   |
|----|---|------|------|
| s1 | 5 | 0.14 | 0.44 |
| s2 | 7 | 0.21 | 0.67 |
| s3 | 8 | 0.24 | 0.78 |
| s4 | 9 | 0.28 | 0.89 |
| s5 | 1 | 0.00 | 0.00 |

2.3.5 Illustrations of String Symmetry

Below we present a few categories of symmetry-randomness metric over various strings.

2.3.5.1 Textual Illustrations

We apply the symmetric metric of randomness to the following texts:

This is a Regular Sentence

It is comprised of n=26 letters, and is divided into no fewer than q=17 symmetric substrings: T~h~ is is~a~~~r e~g~u~1~a~r~~~s~enten~c~e. Evaluating it a symmetry of 64%.

The same sentence, expressed in Base64 will look like:
VGhpcyBpcyBhIHJlZ3VsYXIgc2VudGVuY2U=

It is now comprised of n=36 letters, and it divides to no less than 29 symmetric substrings: V~G~h~pcy BpcyB~h~I~H~J~1~Z~3~V~s~Y~X~I~g~c~2~V~u~d~ G~ V~u~Y~2~U~=evaluating to a randomness metric of 80%.

And converting the same sentence to binary (ASCII):
01010100 01101000 01101001 01110011 00100000
01101001 01110011 00100000 01100001 00100000
01110010 01100101 01100111 01110101 01101100
01100001 01110010 00100000 01110011 01100101
01101110 01110100 01100101 01101110 01100011
01100101 will result in a 208 digits long string, which can be divided to no less than 33 symmetric substrings: 01010-10~0~01101~00001101001011100110010000001101001-0111001100100~0000~11~000010010000~00~1~110010-0110010~10110~011101110~10101~1~0110001100~0~ 0101~11~001000100~0000~11~10011011001~0101~ 101110011101~0~0011001~0~101101~11~0011000110~ 1~10010 1 evaluating to a randomness rating of 15%.

Another textual illustration:

Four score and seven years ago our fathers brought forth on this continent, a new nation, conceived in Liberty, and dedicated to the proposition that all men are created equal.

It is comprised of n=176 letters, and is divided into no less than 157 symmetric substrings: F~o~u~r~~~s~c~o~r~ e~~~a~n~d~~~s~eve~n~~~y~e~a~r~s~~~a~~~g~oo~u~r~~~f~a-~t~h~e~r~s~~~b~r~o~u~g~h~t~~~f~o~r~t~h~~~o~n~~~ t~h~i~s~~~c~o~n~t~i~nen~t~,~a~n~e~w~~~n~a~t~i~o~ n~, ~~~c~o~n~c~e~i~v~e~d~~~i~n~~~L~i~b~e~r~t~y~, ~~~a~ n~dd~e~d~i~c~a~t~e~d~ to t~h~e~~~p~r~opo~s~iti~o~ n~~~t~h~a~t~~~a~ll~~~m~e~n~~~a~r~e~~~c~r~e~a~t~e~ d~~~e~q~u~a~1~. which evaluates to a randomness level of 89%.

2.3.5.2 Numeric Illustrations

The number: 986155371876513341 is comprised of n=18 digits, and divides to no less than q=16 symmetric substrings: 9~8~6~1~55~3~7~1~8~7~6~5~1~33~4~1 which evaluates to 88% randomness rating.

The same number may be converted to binary: 1101-101011111000011100010101111101000001010111011-000111101, in which form it is comprised of 60 digits, and can be divided to no less than 12 symmetric substrings: 1~101101011~1110000111000~1~010111111010~0000 1~0~101111011~00~011110~1 where it evaluates to 19% randomness.

2.3.5.3 Symmetry-Randomness Histograms

Note: this illustration should be clearer after reviewing the section ahead regarding symmetry-randomness frequency curves. We build the histogram for binary strings of size n. The histogram is built by evaluating all $2^n$ possible strings. Each of which evaluates to a randomness measure in the range 1-n. The mapping of $2^n \rightarrow n$ creates the histogram that reflects the value of n. It is readily seen that the maximum number of the smallest number of symmetrical strings for some n-bit string is generally less than half of the range, and that for every n there is a "hilly" graph with greater slope on the left than on the right.

The above described procedure to gauge symmetry (and hence randomness) of an arbitrary string, or an arbitrary set of symbols, may be seen as a hashing procedure. A large set of possible strings is mapped into a limited set of asymmetry-randomness scale. This implies that a large number of strings share the same symmetry-randomness rating. One may opt then to a more refined (higher resolution) scale of symmetry and randomness. We present here two approaches for this objective.

Terminal Cascading.
Multi-Dimensional String Randomness
Randomness Frequency Curves
Encoding Variability

3.1 Terminal Cascading

Given an arbitrary string, s, comprised of $n_0$ symbols. Let it be expressed as concatenation of $q_0$ substrings: $s_1 \| s_2 \|, \ldots s_{q9}$, such that $q_0$ is the smallest number of symmetric substring that concatenate to s. We will then compute $\rho(n_0, q_0)$ as the symmetry based randomness index of s. These symmetric substrings may be regarded as $q_0$ letters in which string s is written, and as such it is subject to symmetry-randomness rating.

Illustration: let s=XXXX010101XXXX5. Here $n_0$=15, and $q_0$=4: s=XXXX-010101-XXXX-5. By interpreting $s_0=s_2$=XXXX=$\alpha$, $s_1$=010101=$\beta$, $s_3$=5=$\gamma$, we can write s=$\alpha\beta\alpha\gamma$. And with regard to that interpretation s can be viewed comprised of $q_0$=$n_1$=4 symbols, which can be symmetry gauged by breaking down s to $q_1$=2 substrings: $\alpha\beta\alpha$ and $\gamma$.

In general this 'cascaded symmetry' may continue until such time that the resultant breakdown of string s is completely random. Namely at some level i we have $q_i=n_i$, where $q_i$ is the number of strings comprising s after applying the cascaded symmetric breakdown process i times. The larger the value of i, the more symmetric string s. In other words, if $s_a$ and $s_b$ are two strings of equal randomness: $\rho(s_a)=\rho(s_b)$, but for $s_a$ we have i=$i_a$ and for $s_b$, i=$i_b$, then if $i_a < i_b$ then $s_a$ is more random than $s_b$. To capture this refinement in randomness assessment, one can use the refined randomness metric $\rho_r$:

$$\rho r(S)=(\pi q_i-1)/(n^i-1)$$

In the above example, the nominal (base) randomness would evaluate to: $\rho$(XXXX010101XXXX5)=(4−1)/(15−1)=21%. And the refined symmetry: (4*2−1)/($15^2$−1)=3.1%

3.2 Multi-Dimensional String Randomness

The symmetric metric for randomness may be further tightened by arranging the examined string in a multi-dimensional setting. This would create new "neighbors" among the letters of the string, and allow for more opportunities to tie letters into a symmetric subset, thereby reducing the measured randomness of the string.

Illustration: Let $s=s^1=$'XYZWXYWZ'. $s^1$ is perfectly random: $q=8$ $\rho(s^1)=1$. Let us now rearrange $s^1$ in a two dimensional setting, $s^2$:

XYZW
| |
XYWZ

In this arrangement the vertical substrings XX and YY are symmetrical, and accordingly $s^2$ may be decomposed into $q=6$ symmetrical substrings, and the corresponding two-dimensional randomness of the string is $\rho(s^2)=5/7$. We see then that $s^2$ is losing its 'perfect randomness' rating upon arranging it in a 2D setting. By comparison, consider the string $s'^1=$'XYZWYXWZ'. It can be similarly arranged into $s'^2$:
XYZW
YXWZ
And still maintain its ranking as perfect randomness ($\rho(s'^2)=1$).

In general consider a string s of size $n=2d$. We can agree on a particular order to configure the n letters of s in a d-dimensional setting, and rate the resultant randomness as above. This will allow one to define increasing measures of randomness.

3.3 Randomness Frequency Curves

We present this concept over strings of data, for convenience, but it applies in a more general way. Let S be a data stream from a source $S_0$. The stream takes the form of a continuous string of symbols. On the receiving end, a reader can chop S to blocks $s_1, s_2, \ldots$ of fixed size: $|s_i|=n$. Each block can be evaluated as written in symmetric substrings, and the lowest count of these substrings per each block string: $q_1, q_2, \ldots$ respectively, will mark the degree of randomness for each block. The range for the q values (the count of minimum symmetric substring per each block string) is $1 \le q_i \le n$ for $i=1, 2, \ldots$. For a stream S comprised of t blocks $s_1$-$s_2$- $\ldots$ -$s_t$ there would be, on average $t/n$ occurrences for each q value. This average can be computed from the symmetry-randomness frequency histogram that reflects the count $I_x$), where x is the variable that represents the range of the q values: $1 \le x \le n$. Clearly: $\Sigma \eta(x)=t$. The histogram itself, or the corresponding frequency curve may be viewed as symmetry-randomness signature of the stream S.

The larger the chopped blocks (large n), the fewer there are off a given S section, but the histogram will be richer (it has n columns), and the resultant frequency curve is more telling—serving as a more productive inference source. So while short blocks will serve to distinguish between say audio, video, and text, larger block will be able to distinguish between styles of text, and music tunes.

For sufficiently long data stream, S, one could group each succession of t blocks into a super-block, and then view S as a steam of super-blocks. Each super-block will be associated with a frequency curve as described above, and each successive curve can be interpreted as a motion of the curve in its two dimensional space—resulting in a vibrational behavior which is another, more refined signature of the data stream.

3.4 Encoding Variability

A given string will be associated with a different symmetry metrics depending on its encoding. Illustration: let $s=$XYYYZXZ. It smallest set of symmetric substrings is: X~YYY~ZXZ, $q=3$, while $n=7$, namely $p(s)=0.33$. Let's now encode: X=10, Y=00, Z=01 and write $s=s'=$ 10000000011001 which is divided to: 1000000001~1001 $q'=2$, $n'=14$ and $\rho(s')=0.08$. With a different encoding: X=10, Y=01, Z=00, we have $s=s''=$10010101001000, which divides to: 10010101001~000, $q''=2$, $n''=14$ leading to the same result: $\rho(s'')=0.08$. However, we can use the following encoding: X=ab Y=bc Z=ca will lead to $s=s'''=$ abbcbcbc-caabca which is divided to $s'''=$a~b~bcbcbc~c~aa~b~c~a with $q'''=8$ $n'''=14$, and $\rho(s''')=0.54$ The above illustrates how to content may be encoded to either increase its observed randomness or to decrease it. So if the objective is to minimize errors and recover from missing parts then the high-symmetry encoding will be preferred, and if one wishes to obscure and hide a message one would seek a form of encoding that would increase the observed randomness. For example: cracking symmetric ciphers is based on the entropic characteristic of text as opposed to a random string of letters. By using proper encoding this distinction may be reduced and frustrate a cryptanalyst.

The symmetric metric of randomness is an easily applied full-scale marking point ranging from 'full randomness' to 'zero randomness'. It can be effectively used to gauge randomness, or lack thereto, and hence is useful for all instances where randomness is an essential part. In particular, a wide range of cryptographic protocols, and various data analytics applications. Degree of randomness may be used as communication alphabet to offer a communication channel with relative advantages for certain circumstances. A great deal of science, and knowledge realization may be depicted as transforming randomness into order. So it is a fitting case for such full scale metric of the order-random scale, to also measure knowledge realization progress.

4.1 Cryptographic Applications

In cryptography one attempts to hide data through a reshaping it into a form where its meaning is lost. In theory then, some hidden symmetries will survive the acrobatics applied to them through a modern cipher. By exposing such hidden symmetries, a cryptanalysis might be rather productive.

Modern ciphers are tested against the risk of correlation, between the ciphertext, C, and the key, K, over a range of plaintexts. And correlation can be used to rank order the key space to effect an accelerated brute force attack. So far though, the prevailing ciphers have not been tested against a correlation based on symmetric-randomness. Any such correlation will similarly be exploited for an accelerated brute force attack.

We write:

$$K_s = f_{cipher}(C_s, P_s)$$

Namely: the symmetry of the cryptographic key, K, ($K_s$) used to encrypt plaintext P via 'cipher', to generate ciphertext C, has a correlation function $f_{cipher}$, with the symmetry exhibited by C and P ($C_s$, $P_s$). Over a long run the symmetry of the plaintext steam is expected to be rather stable, so that the correlation is reduced to: $K_s = f_{cipher}(C_s)$. Since 'cipher' is known, an attacker can explore such symmetry based correlation over a range of possible symmetries. Again, since no cipher is likely to have been so tested, this might be a fruitful cryptanalytic strategy.

The search for productive symmetry correlations may be applied to elements within a cipher. For example, let's consider a given S-box comprised of 16*16 elements, and where each of the 16 combinations 0000~1111 will designated both columns and rows, and where the content is comprised of the 256 combinations of 8 bits. Any such S-box can be tested via a large number of plaintexts, exploring for any correlation between the input and the output, where the respective randomness metrics are compared.

AES is comprised of an effective matching table of every 32 bits string with some other 32 bits strings. This may lead to defining a symmetry of a bit string as a two step operation. The first is to apply the AES 32 bits exchange, over each block of 32 bits in the inspected bit string, then shifting right or left 32 bits. A bit string where each 32 bits block is preceded or followed by the AES matching 32 bits will be fully symmetric (zero randomized string) with respect to this definition.

4.1.1 Symmetry Randomness Filter

Cryptographic protocols require a large influx of randomness, commonly provide algorithmically. By combining such PRNG algorithms with an symmetric metric, one builds a randomization device with a guaranteed threshold level of randomness.

A symmetry-randomness filter will accept a data string as input, would it chop it to pre-agreed blocks, and then rate the symmetry-randomness of each block. Any block that does not pass a randomness level threshold will be dropped. As a result the output stream will be comprised of less data perhaps, but all the data is guaranteed to be of minimum symmetry-randomness levels.

The input to this device may be algorithmic randomness or some other source, like white noise, or some other environmental complexity. It might even be a quantum grade source because while theoretical quantum physics guarantees "perfect randomness" any actualized contraption may have a built in bias. Also, perfect randomness includes strings which don't pass the intuitive read on randomness. Such strings too will be cleaned out by the symmetry-randomness filter.

In summary the symmetric-randomness filter will make it feasible to use less than perfect pseudo random number generators, since they are being scrubbed.

The filter could be applied to a source which select a standard size string in a uniform manner from a set of possible strings. Such uniform selection, on predictable occasion will push forward strings that by any intuitive grasp are not random. Such strings could also see dropped by the described filter. This will reduce the selection field and will make brute force attack easier. To which the answer is to enlarge the original field from where to choose a random string selection.

It is computationally very fast to compute the symmetric randomness grade of a block of data, so there would be disturbing slow down. There would be a slower bit/sec pace because of the dropped blocks. It would be a per case engineering issue how big should the block be. The larger it is the more fine tuned the measure, but the more computational effort is required to compute the grade.

4.1.2 Forgiving Hash

A typical hash function is notoriously non-forgiving. In fact it is designed to reject any data where even one bit has changed relative to the reference data. This of course is important in various data concentration files, like texts and spreadsheets. Alas, for loose data like videos and audios, and rough measurements of some sort, such exactness is counterproductive. One will reject a video dispatch because when hashed it generated an output that differs from the verification hash that was communicated to the reader to insure non-falsification. Clearly flipping a few bits in a rich video stream will have no adverse effect on the product, and will not be noticed by viewers. This raises the need for forgiving hash function where a few bits may be flipped without signaling a falsification, all the while, should the input stream undergo a major modification, the hash will alert for it.

This need can be served through the symmetry-hash function. The way a string is symmetry-randomness measured leaves it unchanged for a few of bits having randomly flipped. Of course the tolerance for a few flipping bits depends on the size of the block that is being so gauged. However a major change in the contents of the input stream will result in a different hash.

Given a data stream S cut into t blocks of size n bits each. The field of $2^n$ bits will be mapped to a symmetry randomness measure that ranges from 1 to n. (Actually smaller than n because no n bit string will be evaluated with q=n—the smallest number of symmetric substring for any block of size n bits wills be about half the value of n. But that is non essential for our discussion here). We have therefore a strong hashing from $2^n \rightarrow n$. By construction it is quite forgiving, while the rate of forgiveness may be readily gauged by the size of the analyzed blocks.

This method can be applied over successive input blocks and in that case the symmetry randomness frequency curve will be the hash that would be compared with the verification hash. By its very design it is very difficult to work one's way back from a frequency curve to an input stream.

4.2 Data Analytics

Since symmetric randomness measures order or lack thereof on a full scale from 'full order' to 'lack of any order' it is also a useful tool to infer with about a given data stream. Text, audio, videos have a different characteristic pattern, that will be reflected in a different randomness marking. This will allow one to quickly analyze a data flow and deduce much about what information it carried.

In some cases data streams will disclose their emotional level, even the topic of their communication based on the quickly calculated randomness-curve.

The user will choose the degree of resolution of the symmetry randomness marker. This is clearly determined by the size of the analyzed block. So by checking sufficiently large block it is impossible to map a data stream on a highly find tuned randomness metric and learn from this fine tuning some subtle information about the screen. In general a string s comprised of n letters, drawn from an alphabet comprised of m letters will be mapped into a symmetry randomness variable that may take the values 1 to n. This amount to a very strong hashing function. Let an input string S be chopped to t blocks of size n=|s| symbols, and each block be evaluated to a symmetry randomness measure which can accept values from 1 to n. This will amount to a mapping function from the block of a range of $m^n \rightarrow n$. By properly defining the symmetric functions it would be possible to extract concise insight from an input stream of data.

In particular we consider a data source S which is suspect to hide a pattern. We may anticipate to catch the pattern by chopping S to blocks, measuring the randomness of each block, and identifying a significantly lower randomness as a clue for a pattern to hunt.

4.3 Entropic Communication

Entropic communication has been developed as geometry free alphabet, and where different degree of mixing of two colors or other entities indicates a specific letter or signal. Such mixing grades are eventually photographed or otherwise read from where they are written, and it is necessary to quickly read their message. The symmetry-randomness metric will do so readily. See FIG. 7

4.4 Knowledge Realization

AI configuration is increasingly geared towards automated knowledge realization where any deviation from randomness is scrutinized, learned and becomes a source of accumulated knowledge, even towards a yet unspecified goal. AI agents face an increasing stream of data and their learning depends on their ability to quickly and efficiently detect non-randomness. It is expected that AI agents will be equipped with symmetry-randomness devices to facilitate this objective.

It is readily seen that a string can exhibit different degrees of randomness dependent on how it is encoded. In general the smaller the number of letters (unitary entities) the greater the symmetry. The string ABCD is 100% random: n=4, q=4 ρ(ABCD)=1. Alas, using the binary ASCII encoding the same string looks like: 0100000101000010 0100001101000100. It is now comprised of 32 bits (n=32), and divides to no less than 5 symmetric substrtings: 0~1000001~010000100100001~1~01000100, q=5, computing to ρ=13%. In a very general way the progress of science is a sequence of encoding a random-looking body of data in a pattern-jul, symmetric fashion, by devising an effective alphabet for the purpose. Having a credible, readily computable method to assess degrees of randomness will facilitate the progress of science whether on the AI pathway or the traditional pathway.

The first question of interest is to what extent does this symmetric metric capture the intuitive notion of randomness. A disorderly string is not likely to have large symmetric sub strings, and hence its randomness metric will be high. An interesting way to appreciate the consistency of this definition with our intuitive grasp is by trying to build a highly randomized string out of a given alphabet.

Let's try with an alphabet of m=4 (four unitary entities). We consider strings of varying length, comprised of the letters X, Y, Z, and W. For strings of size n=4, it is easy, any sequence of the four letters will be rated as fully randomized. Let's use then s=XYZW. Now setting up the 5th letter, we can't use W since it will combine with the letter W at the 4th position to define a symmetric substring. We can't use Z either, since the substring ZWZ will rate as symmetric. So let's choose X (between X and Y). Now s(n=5)='XYZWX' The 6th letter can't be X and can't be W (as argued above). So we have to choose between Y and Z. let's choose Y: s(n=6)='XYZWXY' The 7th letter can't be Y, nor X, but not Z either because it will then create a perfectly symmetric string based on exchange symmetry. So we have to use W: S(n=7)='XYZWXYW' The 8th letter can't be W, can't be Y, but also can't be X because it will then define a substring WXYWX, which is symmetric by exchange. So far we encountered two subsequent instances where we had no choice, only one letter was possible to insure the randomness of the growing string. It is conjectured that it would be hard to build a fully randomized string of size n, but it will be possible.

By contrast, for m=2 and m=3 it is impossible to build a fully randomized string, as is readily shown: for m=2, for n=2 we have s='01' or s='10' because '00, or '11' are symmetric. But the third letter will make '01' to '011' or '010'—both are symmetric. For m=3 we start s='XYZ'. The forth letter will have to be X: s='XYZX'. The fifth letter can't be X nor Z, but also Y won't do because s='XYZXY is exchange symmetric.

This demonstrates how difficult it is to construct a fully randomized string, which is consistent with the intuitive grasp. On the other hand, envisioned orderly strings will rate as low randomness. E.g. 0000 . . . 0, 01010101 . . . , 10011001001 . . . .

The second question that comes to mind, is utility. How useful is this metrics of randomness. The gallery of use cased presented herein will serve as a fit answer.

The third question of interest is how does the symmetric metric compare with the more established means to measure randomness. As mentioned in the introduction the common metrics for randomness either address the means for generating the randomness candidate string, or to means to decipher it, to learn its pattern, or thirdly to a Turing machine test—whether there is a smaller string that can generate the candidate string via a Turing machine. And one more: reading entropy through Shannon's entropy which is based on calculated probabilities. By contrast the symmetric metric is based only on the candidate string per se, not even on the alphabet from which its letters are drawn. It is easy to measure and to deduce from.

So in summary, The symmetric metric of randomness is (i) a novel valid method to gauge randomness. It is not a derivative of any existing method, and (ii) it is very consistent with the intuitive grasp of the concept. Third (iii) it lends itself to a quick computation, especially over an arbitrary string of symbols. It's measurement (iv) may be gauged as to its resolution. The symmetric metric of measurement is a basis for advanced metrics of the same, and is a foundation for critical tasks, in learning, data analytics, cyber security, and complex systems. It is expected to be studied further, validated, and properly appraised as to its fitness for the variety of tasks for which symmetric-randomness is potentially a good fit.

What is claimed is:

1. A device for generation of random bits comprising:
   a fluid container,
   a first fluid of electrical conductivity $R_h$, and a second fluid of electrical conductivity $R_l$, such that $R_h \neq R_l$, and the specific gravity of the first fluid is higher than the specific gravity of the second fluid,
   a pump to pump the second fluid from the bottom of the fluid container to its top,
   and where the two fluids are mutually non-dissolving, of viscosity similar to water and oil for liquids, and viscosity similar to oxygen, helium or nitrogen for gases, the two fluids are both liquids, or one liquid and one gas,
   a bubble generator apparatus that forms rising bubbles of the second fluid within the bulk of the first fluid,
   an electric circuitry comprising:
   (i) two electrodes placed inside the fluid container such that current through the mixture of the first and the second fluids is closing an electrical circuit,
   (ii) electronic measuring elements to measure the value of the current in the electrical circuit over time,
   (iii) a computing element to extract a stream of bits from the readings of the electrical current over time, wherein
(i) the first fluid is poured into the fluid container, then
(ii) the pump is moving the second fluid to the bubble generator, which is placed beneath the fluid container, then
(iii) the bubble generator is generating bubbles of the second fluid rising in the bulk of the first fluid in the fluid container, then
(iv) the bubble generator generates bubbles of various size, at various spots in the fluid container, and at various frequencies, thereby the fluid that separates between the two electrodes is a different mixture of the first and second fluid, and since the two fluids have different electrical conductivity values, the measured electrical current over time does fluctuate;
(v) the fluctuating electrical current is captured by the electronic circuitry in the device, this circuitry extracts randomness from the fluctuating current as follows:
selecting an arbitrary time interval Δt, the electronic circuitry reads the value of the current at the beginning instance of the interval, $I_b$, and at the ending instance of the interval, $I_e$; if $I_e \geq I_b$ then a bit valued "1" is generated by the electronic circuitry, if $I_e < I_b$, then a bit valued "0" is generated by the electronic circuitry, this process continues over the next time interval Δt, and thereby additional bits are generated and routed to a port from where they are communicated to the consumer of the random sequence of bits.

2. The device in claim 1 where the second fluid is air, pumped through a liquid.

3. The device in claim 1 where the second fluid and the first fluid are in a closed system and the second fluid circulates from the bubble generator to the top surface of the first fluid and from there it is circulated back to the bubble generator.

4. The device in claim 1 where the bubble generator is constructed as a disc apparatus, comprising a series of rotating discs which rotate perpendicular to the fluid flow, and where each disc rotates at a speed controlled by the electronic circuitry and where in each disc holes are drilled, where the holes are at various locations, and various sizes, and where the discs rotate abreast to each other, and where the pump moves the second fluid towards the disc apparatus from the bottom, and where as the discs rotate there are instances where the holes in the various discs do align, and allow the second fluid to escape upwards towards the bulk of the first fluid that is placed on top of the bubble generator;

and as the discs rotate the holes alignment that allows for the second fluid to escape upwards is disturbed and no more second fluid is escaping from that location, the escaped second fluid then forms a bubble that rises through the bulk of the first fluid;

and where based on the rotation regimen of the discs and their holes, at various locations and various times, bubbles of various sizes are generated and rise through the first fluid, resulting in fluctuating electric resistance within the mix of the fluid in the volume between the electrodes in the fluid container, resulting in a fluctuating current.

5. The device in claim 1 where the random output is used as guidance for the electronic circuitry to vary the rotation speed and the direction (clockwise or counterclockwise) of each of the discs in the bubble generator.

* * * * *